United States Patent
Sanderovich et al.

(10) Patent No.: US 10,887,723 B2
(45) Date of Patent: Jan. 5, 2021

(54) MILLIMETER WAVE RANGING WITH SIX DEGREES OF FREEDOM

(71) Applicant: QUALCOMM Incorporated, San Diego, CA (US)

(72) Inventors: Amichai Sanderovich, Atlit (IL); Javier Frydman, Tel-Mond (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 15/853,253

(22) Filed: Dec. 22, 2017

(65) Prior Publication Data

US 2019/0200164 A1 Jun. 27, 2019

(51) Int. Cl.
| | | |
|---|---|---|
| H04W 4/02 | (2018.01) | |
| G01S 13/46 | (2006.01) | |
| G01S 5/12 | (2006.01) | |
| G01S 5/14 | (2006.01) | |
| G01S 13/76 | (2006.01) | |
| G01S 13/87 | (2006.01) | |
| G01S 5/02 | (2010.01) | |
| A63F 13/21 | (2014.01) | |
| A63F 13/30 | (2014.01) | |

(52) U.S. Cl.
CPC ........... *H04W 4/023* (2013.01); *G01S 5/0247* (2013.01); *G01S 5/0263* (2013.01); *G01S 5/12* (2013.01); *G01S 5/14* (2013.01); *G01S 13/46* (2013.01); *G01S 13/765* (2013.01); *G01S 13/874* (2013.01); *G01S 13/878* (2013.01)

(58) Field of Classification Search
CPC ..... H04W 4/023; H04W 4/025; H04W 4/026; G01S 13/874; G01S 5/14; G01S 13/878; G01S 13/765; G01S 13/46; G01S 5/12; G01S 5/0247; G01S 5/0263
See application file for complete search history.

(56) References Cited

U.S. PATENT DOCUMENTS

| | | | |
|---|---|---|---|
| 7,821,453 B2* | 10/2010 | Wu | G01S 5/0278 342/357.28 |
| 8,848,565 B2 | 9/2014 | Curticapean | |
| 9,069,336 B2 | 6/2015 | Kim et al. | |
| 9,279,880 B2* | 3/2016 | McCorkle | G01S 5/12 |
| 9,405,372 B2* | 8/2016 | Yen | A63F 13/06 |
| 9,442,564 B1* | 9/2016 | Dillon | G06F 3/012 |

(Continued)

FOREIGN PATENT DOCUMENTS

| | | |
|---|---|---|
| KR | 101547825 B1 | 8/2015 |
| WO | 2016030571 A1 | 3/2016 |

OTHER PUBLICATIONS

International Search Report and Written Opinion—PCT/US2018/063999—ISA/EPO—dated Feb. 27, 2019.

*Primary Examiner* — Ahmed Elallam
(74) *Attorney, Agent, or Firm* — Steven R. Thiel

(57) ABSTRACT

Various aspects of the disclosure relate to millimeter wave ranging with six degrees of freedom. For example, a multi-gigabyte link (e.g., an IEEE 802.11ad link or an 802.11ay link) and RF/Antenna diversity modules can be used to conduct round trip time (RTT) distance measurements between an anchor point and a station. Relative location information (e.g., degrees of freedom) between the wireless devices can then be determined based on the distance measurements.

18 Claims, 21 Drawing Sheets

(56) References Cited

U.S. PATENT DOCUMENTS

| | | | |
|---|---|---|---|
| 9,536,421 B2* | 1/2017 | Singhar | G08C 17/02 |
| 9,652,031 B1* | 5/2017 | Savastinuk | G06F 3/012 |
| 9,661,121 B2* | 5/2017 | Singhar | G08C 17/02 |
| 9,774,996 B1 | 9/2017 | Frydman et al. | |
| 10,575,955 B2* | 3/2020 | Mahfouz | A61F 2/4657 |
| 2012/0212374 A1 | 8/2012 | Kirby et al. | |
| 2012/0326923 A1 | 12/2012 | Oehler et al. | |
| 2016/0071526 A1* | 3/2016 | Wingate | G10L 21/028 704/233 |
| 2016/0238692 A1 | 8/2016 | Hill et al. | |
| 2017/0030705 A1 | 2/2017 | Bridges | |
| 2017/0142680 A1 | 5/2017 | Malkin et al. | |
| 2019/0015685 A1* | 1/2019 | Ostyn | A61G 13/02 |
| 2019/0154439 A1* | 5/2019 | Binder | G01S 15/08 |

* cited by examiner

HEADSET WITH RF MODULES

MILLIMETER WAVE RANGING WITH SIX DEGREES OF FREEDOM

INTRODUCTION

Various aspects described herein relate to wireless communication and, more particularly but not exclusively, to millimeter wave ranging with six degrees of freedom.

Some types of wireless communication devices employ multiple antennas to provide a higher level of performance as compared to devices that use a single antenna. For example, a wireless multiple-in-multiple-out (MIMO) system (e.g., a wireless local area network (WLAN) that supports the IEEE 802.11ad specification) may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

In a system that supports the IEEE 802.11ad specification, a Time of Flight measurement may conducted using a fine timing measurement (FTM) flow as defined in the IEEE 802.11-2016 specification. In the millimeter wave (mmW) band (e.g., 60 GHz band), the distance resolution and the angle of arrival resolution of the measurement may have a very high accuracy (e.g., a 0.5 centimeter (cm) distance resolution).

RF/Antenna module diversity may be employed in a mmW system. For example, several RF/Antenna modules may be connected to a baseband chip, where one of the modules may be activated at a specific instance to maintain a link to send and/or receive mmW signals.

Given the above, systems with very accurate location capabilities may be developed. For example, U.S. Pat. No. 9,774,996 discloses a station (STA) with RF/Antenna diversity that may use self-triangulation for homing purposes towards an anchor point (AP).

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication. The apparatus includes an interface and a processing system. In some aspects, the interface is configured to obtain a plurality of signals. In addition, the processing system is configured to: estimate a plurality of distances between a first plurality of antennas and a second plurality of antennas based on the plurality of signals, determine six degrees of freedom between the apparatus for wireless communication and another apparatus based on the plurality of distances, and generate an indication of the six degrees of freedom. In some aspects, the interface is further configured to output the indication. In some implementations, separate interfaces could be used to obtain the plurality of signals and to output the indication.

In some aspects, the disclosure provides a method of communication. The method includes: obtaining a plurality of signals; estimating a plurality of distances between a first plurality of antennas and a second plurality of antennas based on the plurality of signals; determining six degrees of freedom between an apparatus and another apparatus based on the plurality of distances; generating an indication of the six degrees of freedom; and outputting the indication.

In some aspects, the disclosure provides an apparatus configured for communication. The apparatus includes: means for obtaining a plurality of signals; means for estimating a plurality of distances between a first plurality of antennas and a second plurality of antennas based on the plurality of signals; means for determining six degrees of freedom between the apparatus for communication and another apparatus based on the plurality of distances; means for generating an indication of the six degrees of freedom; and means for outputting the indication.

In some aspects, the disclosure provides a wireless node. The wireless node includes: a first plurality of antennas; a receiver configured to receive a plurality of signals via the first plurality of antennas; a processing system configured to: estimate a plurality of distances between the first plurality of antennas and a second plurality of antennas based on the plurality of signals, determine six degrees of freedom between the wireless node and another wireless node based on the plurality of distances, and generate an indication of the six degrees of freedom; and an interface configured to output the indication.

In some aspects, the disclosure provides a computer-readable medium (e.g., a non-transitory computer-readable medium) storing computer-executable code, including code to: obtain a plurality of signals; estimate a plurality of distances between a first plurality of antennas and a second plurality of antennas based on the plurality of signals; determine six degrees of freedom between an apparatus and another apparatus based on the plurality of distances; generate an indication of the six degrees of freedom; and output the indication.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
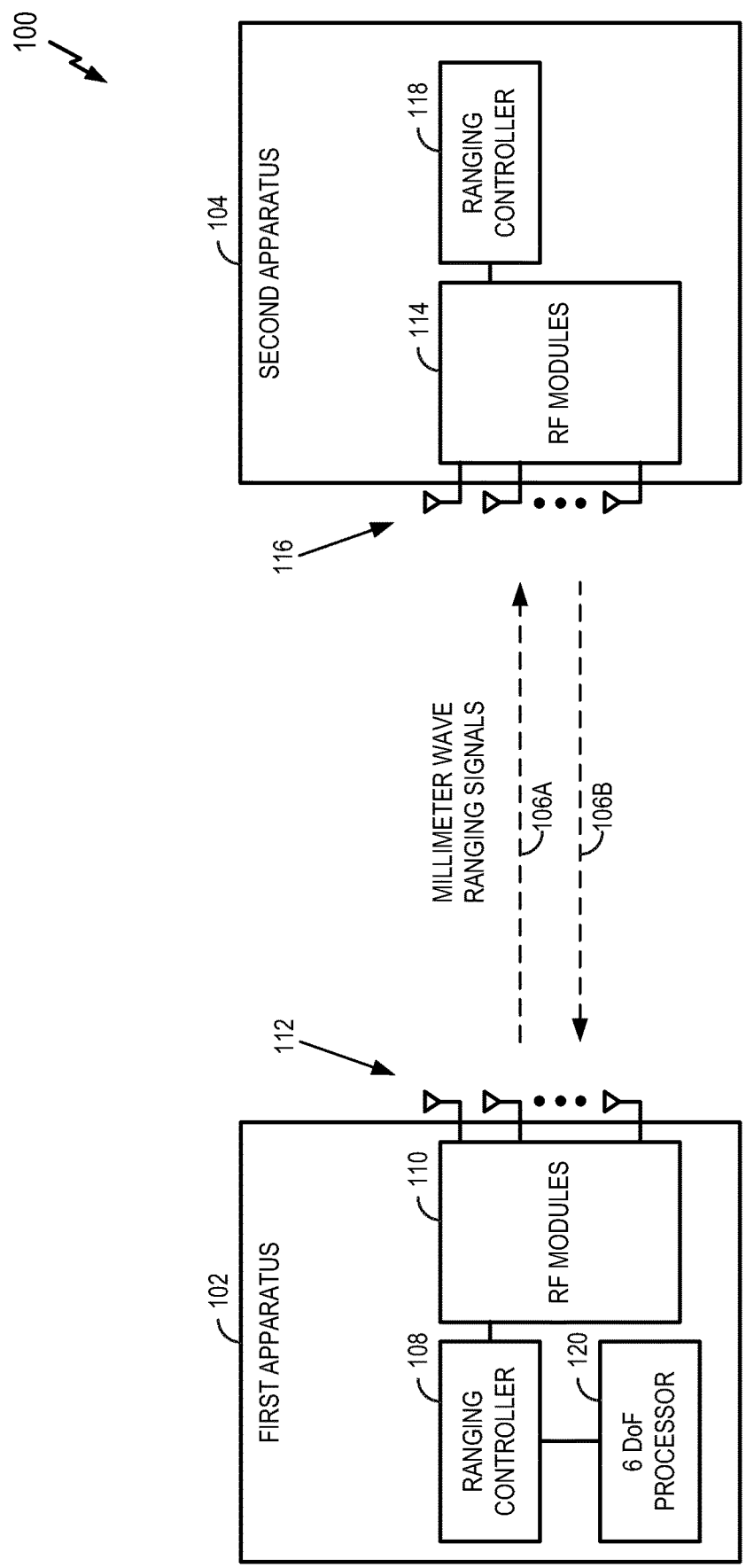
FIG. 1 illustrates an example of wireless communication components in accordance with some aspects of the disclosure.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may include at least one element of a claim. As an example of the above, in some aspects, a method of communication includes obtaining a plurality of signals, estimating a plurality of distances between a first plurality of antennas and a second plurality of antennas based on the obtained plurality of signals, determining six degrees of freedom between an apparatus and another apparatus based on the plurality of distances, generating an indication of the six degrees of freedom, and outputting the indication.

The disclosure relates in some aspects to a location system where wireless devices have RF/Antenna diversity. For example, a multi-gigabyte link (e.g., an IEEE 802.11ad link, an 802.11ay link, or an 801.11az link) and RF/Antenna diversity modules can be used to conduct round trip time (RTT) distance measurements between an anchor point (AP) and a station (STA). Relative location information (e.g., degrees of freedom) between the wireless devices are then determined based on the distance measurements.

In some implementations, the location system may be used to determine the location of a mobile device relative to at least one reference point. For example, the mobile device may be a robotic device, a remote control device (e.g., a drone such as a quadcopter), a cell, or some other type of device. As a specific example, a drone may be controlled to land on an AP (e.g., a charging station, a delivery point, a home base, etc.) through the use of the location system described herein.

In some implementations, the location system may be used in an augmented reality or virtual reality system (hereafter, an "AR/VR system"). An AR/VR system may transmit a large amount of data from a console to a headset (e.g., a head mounted display, HMD). In conventional systems, this data is transmitted via a wired connection. However, such a connection limits the movements of a gamer. In conventional AR/VR systems, a gamer's location is determined through the use of sensors (e.g., IR sensors located on the headset) and transmitters located near the display (or vice versa). These sensors may be used to estimate the gamer's location with respect to six degrees of freedom (6 DoF).

The disclosure relates in some aspects to using RF/Antenna diversity modules and mmW signaling to determine the 6 DOF between the AP and the AR/VR headset (based on distance measurements between the AP and the AR/VR headset). RF/Antenna modules are located on the VR headset and RF/Antenna modules may be located on or near the AP (e.g., on or near a display device). Given that distance can be measured with high accuracy using such a system, external location sensors (e.g., IR sensors) used in conventional systems are not needed. Moreover, since the wavelength λ of a mmW signal is relatively short, an antenna with a length of λ/2 length is relatively small (e.g., 2.5 millimeters for 60 GHz). Consequently, an antenna array (e.g., including 2, 4, 8, 16, 32, or some other number of antenna elements) may be used for mmW signaling. By incorporating multiple antenna elements into each Antenna module, very accurate angle of arrival estimates may be made (e.g., within 1 degree, ½ degree, etc., depending on the number of antenna elements).

Example Communication Components

FIG. 1 illustrates a wireless communication system 100 where a first apparatus 102 and a second apparatus 104 conduct ranging operations by respectively transmitting millimeter wave (mmW) ranging signals 106A and 106B. For example, in an implementation that conducts round trip time (RTT) measurements, the first apparatus 102 sends mmW ranging signals 106A to the second apparatus 104 and the second apparatus responds by sending mmW ranging signals 106B back to the first apparatus 102. In this way, the first apparatus 102 may calculate the RTT of the signals 106A and 106B and thereby estimate the distance between the first apparatus 102 and the second apparatus 104.

To this end, during the first portion of the RTT measurement, a ranging controller 108 of the first apparatus 102 causes a set of radio frequency (RF) modules 110 (e.g., at least one RF transceiver) to generate the mmW ranging signals 106A that are transmitted via associated antennas 112. As discussed in more detail below, each antenna 112 connected to each of the RF modules 110 transmits a ranging signal. The antennas 112 may be referred to as transmit antennas during the first portion of the RTT measurement.

A set of RF modules 114 of the second apparatus 104 receives the mmW ranging signals 106A via associated antennas 116. Here, each antenna 116 receives a ranging signal from each of the transmit antennas 112. The antennas 116 may be referred to as receive antennas during the first portion of the RTT measurement.

During the first portion of the RTT measurement, a ranging controller 118 of the second apparatus 104 may then cause the RF modules 110 to generate the mmW ranging signals 106B that are transmitted via the antennas 116. The antennas 116 may be referred to as transmit antennas during the second portion of the RTT measurement.

The RF modules 110 receive the mmW ranging signals 106B via the antennas 112. The antennas 112 may be referred to as receive antennas during the second portion of the RTT measurement.

The ranging controller 108 determines the RTTs between the antennas 112 and the antennas 116 based on, for example, the times the mmW ranging signals 106A were transmitted from the first apparatus 102 and the times the mmW ranging signals 106B are received at the first apparatus 102 (e.g., accounting for turn-around delay at the second apparatus). The ranging controller 108 may then estimate the distance between the antennas 112 and the antennas 116.

A 6 DoF processor 120 at the first apparatus 102 may then use these distance estimates to calculate 6 DoF between the first apparatus 102 and the second apparatus 104. In this way, the relative distance and orientation of the first apparatus 102 and the second apparatus 104 may be tracked over time (e.g., for VR, gaming, or other applications).

Example Communication System

Figure 2:
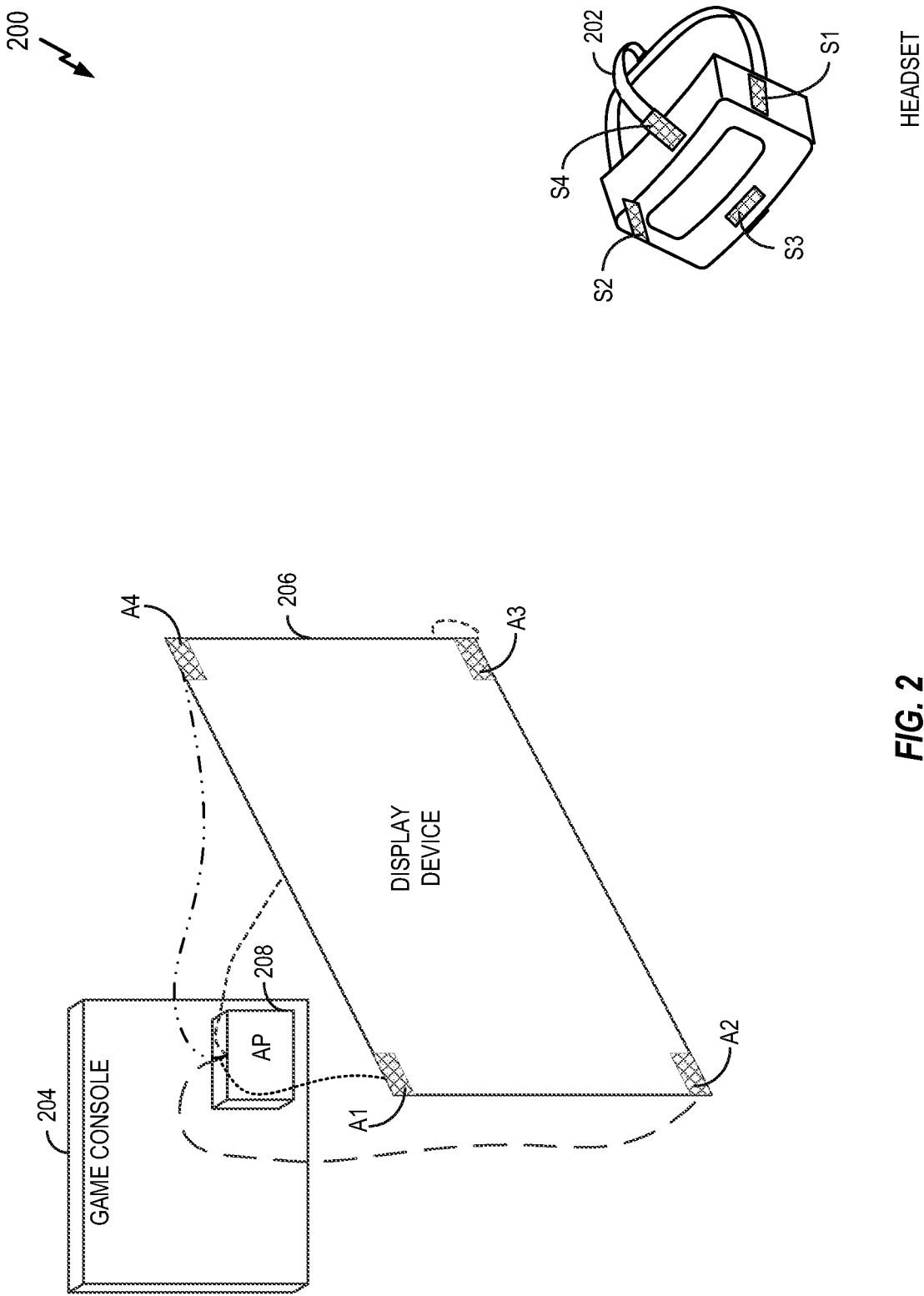
FIG. 2 illustrates an example of a wireless communication system in which aspects of the present disclosure may be employed.

FIG. 2 illustrates an example communication system 200 where a headset 202 communicates with a game console 204. The game console 204 generates video signals that are displayed on a display device 206 for viewing by a user of the headset 202.

In accordance with the teachings herein, the game console 204 is associated with (e.g., includes) an anchor point (AP) 208 that conducts ranging operations in cooperation with the headset 202. To this end, the anchor point 208 (e.g., a ranging controller of the anchor point 208, not shown) can transmit and/or receive mmW signals via a set of RF Modules/Antennas A1, A2, A3, and A4. In addition, the headset 202 can transmit and/or receive mmW signals via a set of RF Modules/Antennas S1, S2, S3, and S4 (e.g., in conjunction with a ranging controller, not shown, of the headset 202).

Example Degrees of Freedom

Figure 3:
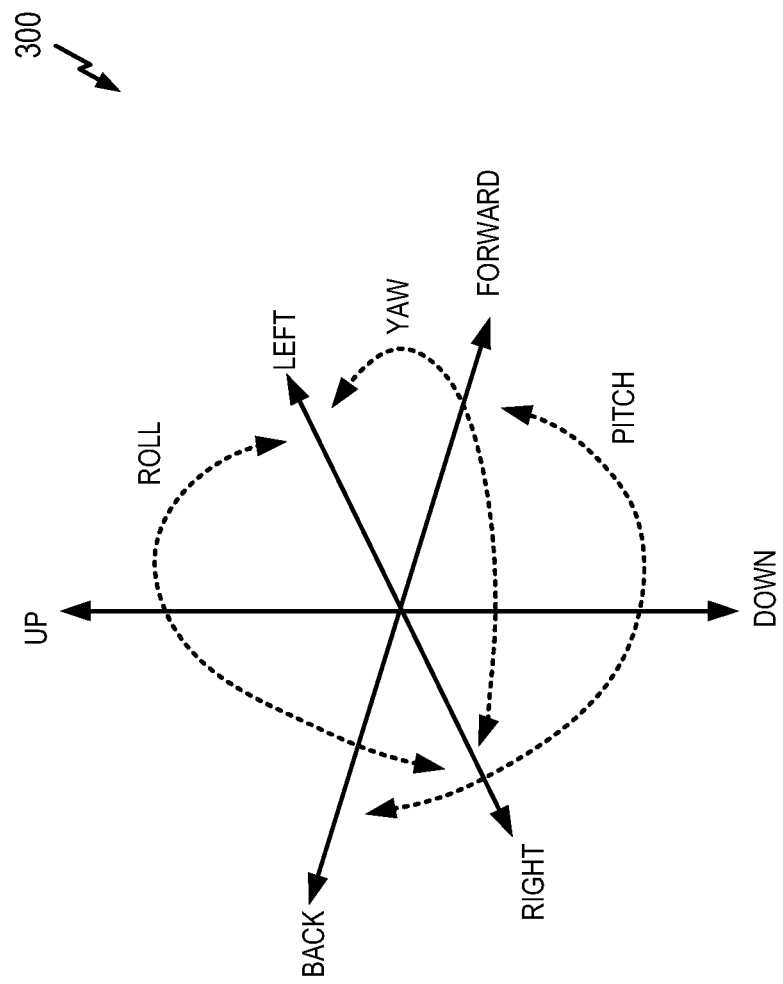
FIG. 3 illustrates an example of six degrees of freedom in accordance with some aspects of the disclosure.

FIG. 3 illustrates an example of 6 DoF between devices that may be determined in accordance with the teachings herein. As illustrated, the 6 DoF include: Up-Down, Right-Left, Back-Forward, Roll, Yaw, and Pitch. By monitoring changes in the distances between the RF Modules/Antennas of an AP the RF Modules/Antennas of a STA, a location system in accordance with the teachings herein can identify a change in any of the 6 DoF of the STA relative to the AP.

Example Distance Measurement

Figure 4:
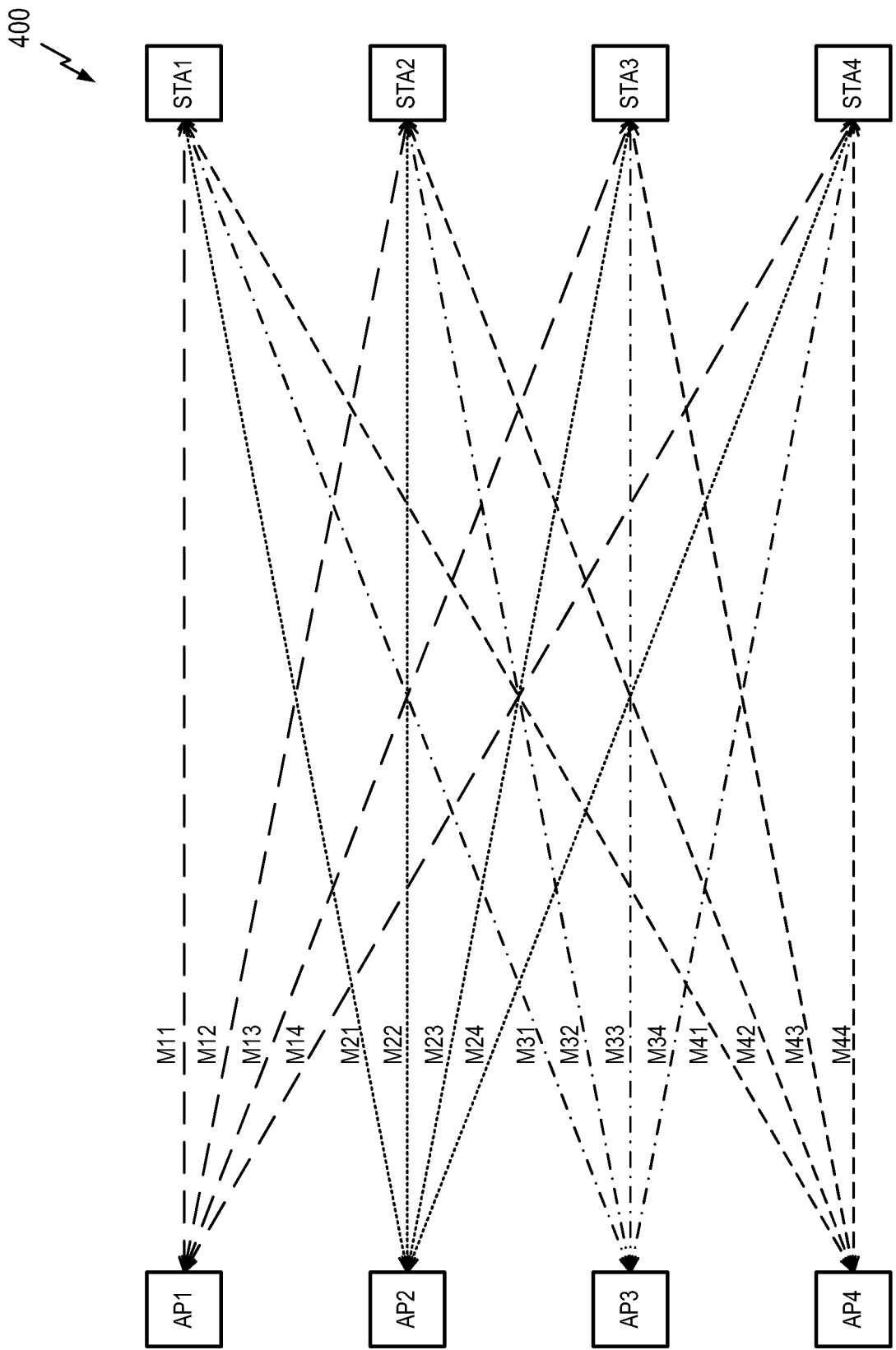
FIG. 4 illustrates an example of a distance measurements in accordance with some aspects of the disclosure.

A system having four RF/Antenna diversity modules associated with (e.g., on) the AP and the STA can have up to 16 links and can therefore take 16 ranging measurements to detect the position and orientation of the STA in the space relative to the AP. FIG. 4 illustrates example distance measurements of a 4×4 RF/Antenna diversity system. These distance measurements may be represented as Mij (e.g., the lines M11, M12, etc., depicted in FIG. 4), where i refers to the corresponding AP and j refers to the corresponding STA.

In a scenario where the AP is fixed in location and the STA (e.g., an HMD) is moving, the relative translation D and the relative rotation H of the STA to the AP can be estimated from the distance measurements Mij. Equation 1 relates the distance measurements to the rotation and translation.

$$M_{ij} = |Hx_{STA}(j) + D - x_{AP}(i)|^2 + n_{ij} \qquad \text{EQUATION 1}$$

In one example, H is a 3×3 matrix, D is a 3×1 vector, and $x_{STA}(j)$, $x_{AP}(i)$ are the 3×1 vectors for the XYZ locations of the jth sensor in the STA and the ith sensor in the AP, respectively, and $n_{ij}$ is an additive independent noise of measurement, which can vary in statistical properties per ij. For example, $x_{STA}(j)$ may be the set of distances between the RF/Antenna modules of a STA, while $x_{AP}(i)$ may be the set of distances between the RF/Antenna modules of an AP.

H may have further constraints, being a rotation matrix. For example: 1) the norm of each of the rows of H is one; and 2) each row of H is orthogonal to the other two rows.

In total, there may be 6 constraints and 3 degrees of freedom (the rotation itself) on the matrix H. These represent rotation about the x axis, the y axis, and the z axis. This underlying mathematical problem is a minimization problem with a convex objective function and non-convex, non-linear constraints. Known iterative solutions include Bregman iterations, augmented Lagrangian, as well as geometrical approaches that maintain orthogonality throughout the iterations. If the locations of the sensors relative to each other (e.g., $x_{STA}(j)$, $x_{AP}(i)$) within each unit are known to within a good accuracy, and the variance of the distance measurements (e.g. 0.5 cm) are also known, the 6 DoF can be accurately estimated.

It should be appreciated that the 6 DoF may be determined from fewer than 16 measurements (e.g., 16 measurements may simply be used to improve the 6 DoF location accuracy). For example, a 3×2 (or 2×3) RF/Antenna diversity system may be sufficient to obtain the 6 DoF. Also, the teachings herein may be used to determine a number of DoF other than 6 DoF (e.g., 5 DoF, etc.).

In some implementations, the system may be calibrated based on measurements taken when the 6 DoF are known. For example, the AP and the STA may be placed in a calibration structure that causes the AP's RF/Antenna modules and STA's RF/Antenna modules to be at known distances from each other, whereby D and H will be known. Equation 1 may then be calibrated (e.g., by adjusting $n_{ij}$) to obtain the known D and H during calibration.

Angle of Arrival/Departure

In some implementations, angle of departure and/or angle of arrival may be used to estimate the 6 DoF. For example, angle of departure estimates and/or angle of arrival estimates may be used in conjunction with distance measurements to determine the relative translation D and the relative rotation H.

Figure 5:
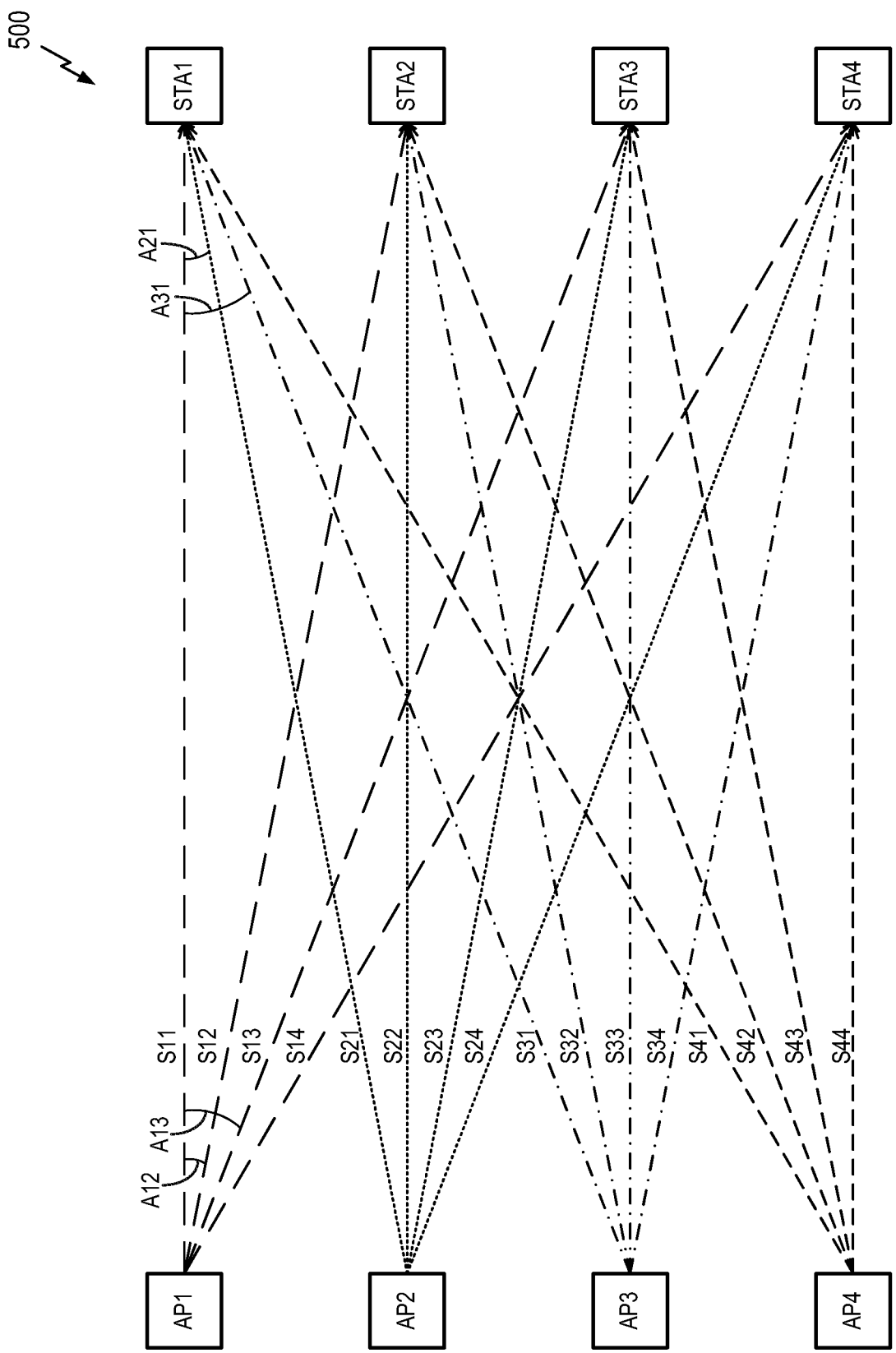
FIG. 5 illustrates an example of angle measurements in accordance with some aspects of the disclosure.

For angle of departure, an apparatus (e.g., an AP) may determine the angle of departure for each mmW signal sent from each of its RF/Antenna modules. For example, as shown in FIG. 5, an AP may calculate the departure angle (e.g., relative to a designated direction reference) for each of signals Sij. Angle M11 for signal S11 and angle M12 for signal S12 are shown in FIG. 5 for purposes of illustration.

For angle of arrival, an apparatus (e.g., a STA) may determine the angle of arrival for each mmW signal received at each of its RF/Antenna modules. For example, as shown in FIG. 5, a STA may calculate the arrival angle (e.g., relative to a designated direction reference) for each of signals Sij. Angle M11 for signal S11 and angle M21 for signal S21 are shown in FIG. 5 for purposes of illustration.

Example RF/Antenna Diversity Connectivity

Figure 6:
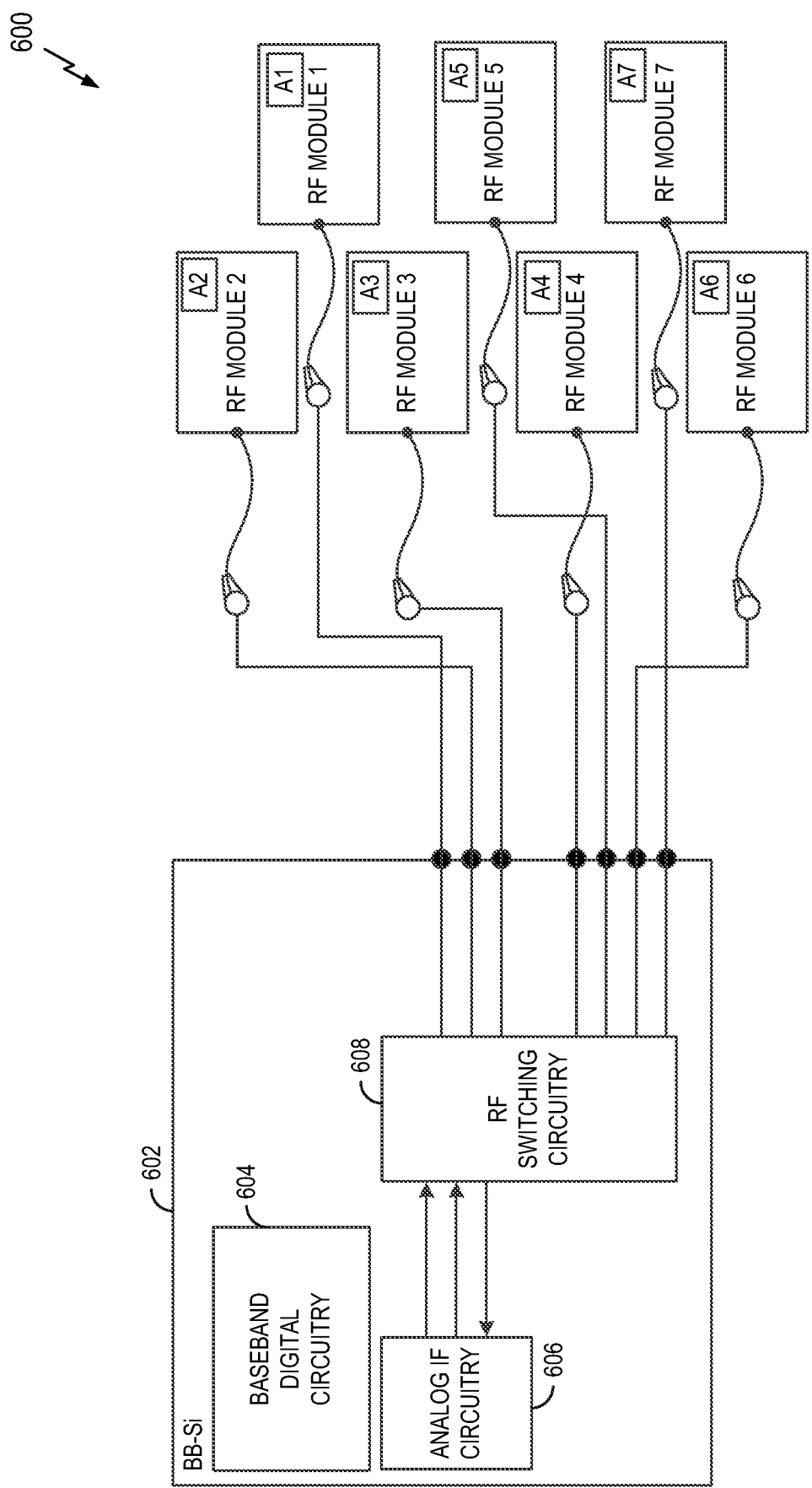
FIG. 6 illustrates an example of RF/Antenna diversity in accordance with some aspects of the disclosure.

FIG. 6 illustrates an example of a system 600 with RF/Antenna diversity. Here, a baseband silicon component (e.g., an integrated circuit) 602 includes baseband digital circuitry 604, analog intermediate frequency (IF) circuitry 606, and RF switching circuitry 608. The RF switching circuitry 608 sends mmW signals to and receives mmW signals from each of seven RF modules (RF module 1-RF module 7). As indicated, each respective RF module includes or is connected to at least one antenna as represented by antenna A1-antenna A7. In some implementations, the system 600 may be incorporated into a phased array-controlled beamforming device.

Combining 6 DoF

Figure 7:
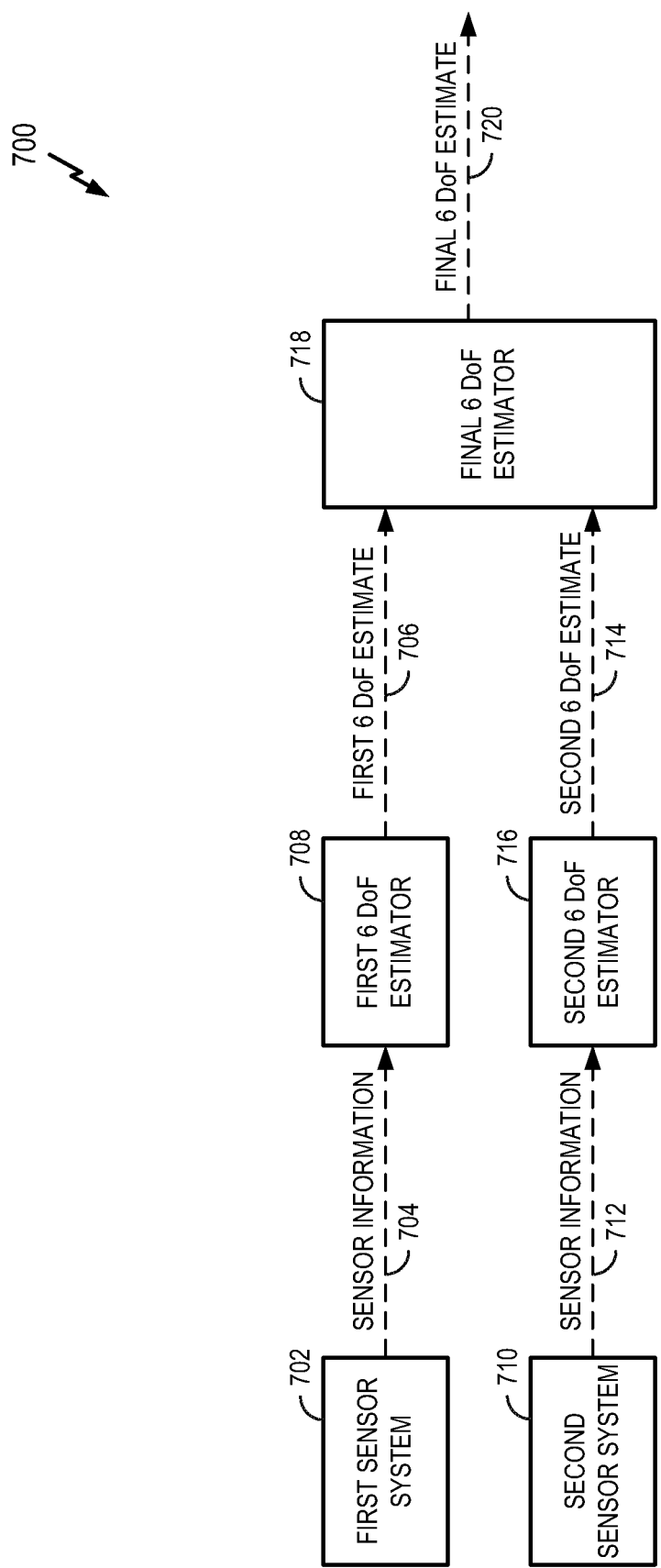
FIG. 7 illustrates an example of determining six degrees of freedom using different types of sensors in accordance with some aspects of the disclosure.

FIG. 7 illustrates an example of a system 700 that uses 6 DoF estimates obtained from different types of sensors to provide a final 6 DoF estimate. For example, a 6 DoF estimate based on distance measurements as taught herein may be used in conjunction with a 6 DoF estimate generated based on signals from an inertia sensor system, a 6 DoF estimate generated based on signals from a light source and camera system, a 6 DoF estimate generated based on signals from some other system, or any combination thereof. For purposes of illustration, FIG. 7 illustrates a scenario where a final 6 DoF estimate is based on two 6 DoF estimates. A final 6 DoF estimate may be based on more than two 6 DoF estimates in other scenarios.

A first sensor system 702 provides information 704 to generate a first 6 DoF estimate 706. For example, the first sensor system 702 may conduct distance measurements as discussed herein to provide the information 704 (e.g., distance information) that a first 6 DoF estimator 708 uses to generate the first 6 DoF estimate 706.

A second sensor system 710 provides information 712 to generate a second 6 DoF estimate 714. For example, the second sensor system 710 may conduct inertia-based or light-based measurements as discussed herein to provide the information 712 (e.g., (e.g. inertia-based or light-based information) that a second 6 DoF estimator 716 uses to generate the second 6 DoF estimate 714.

A final 6 DoF estimator 718 generates a final 6 DoF estimate 720 based on the first 6 DoF estimate 706 and the second 6 DoF estimate 714. For example, for each degree of freedom, the final 6 DoF estimator 718 may calculate an average degree of freedom from the first 6 DoF estimate 706 and the second DoF estimate 714. Other techniques could be used to calculate the final 6 DoF estimate.

Example Signaling

Figure 8:
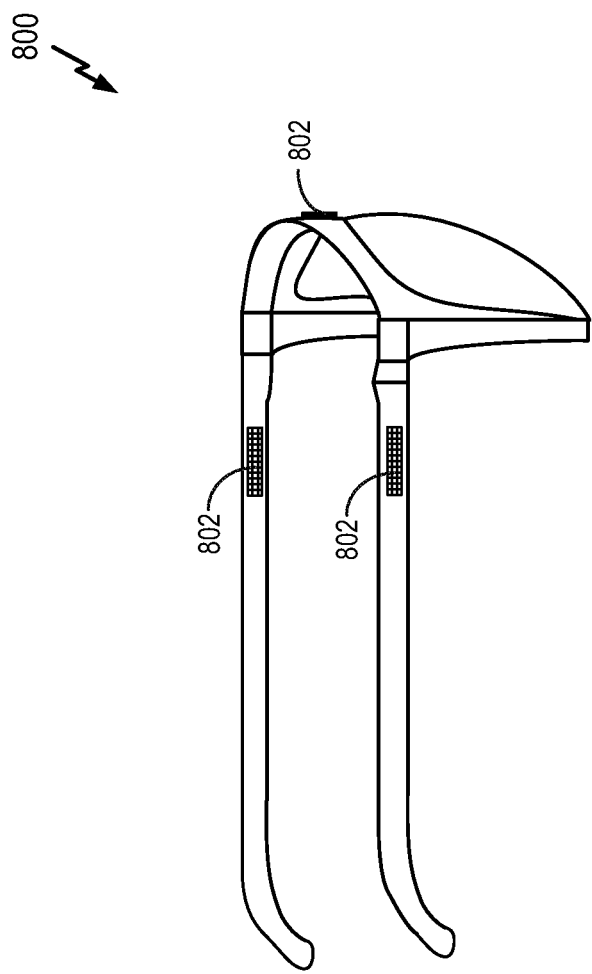
FIG. 8 illustrates an example of locations for RF/Antenna modules in accordance with some aspects of the disclosure.

FIG. 8 illustrates an example of a headset 800 that includes RF modules 802 (and associated antennas) in accordance with the teachings herein. Several example locations for placing the RF modules 802 are indicated. In some aspects, each of the RF modules 802 may be spaced apart from one another at a distance that is greater than the resolution (e.g., sampling error) of the system (e.g., 0.5 cm, 1.5 cm, etc.). In some aspects, each of the RF modules 802 may be spaced apart from one another at a distance that is greater than the wavelength of the antenna array.

Other Aspects

In view of the above, in some aspects the disclosure relates to using multiple RF/Antenna modules at first and second devices to conduct RTT distance measurements and determining 6 DoF between the devices based on the measurements. Multiple RF/Antenna modules may be located at the first device (e.g., an anchor point) and multiple RF/Antenna modules may be located at the second device (e.g., a headset). The distance between each antenna on the second device may be greater than the distance resolution of the system (e.g., greater than the wavelength of the RTT measurement signal). The 6 DoF may be calculated from a system of equations based on the RTT measurements. The 6 DoF may be calculated from relative translation parameters and relative rotation parameters determined from the RTT measurements.

Example Wireless Communication System

The teachings herein may be implemented using various wireless technologies and/or various spectra. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols such as 802.11ad, 802.11ay, and 802.11az.

In some aspects, wireless signals may be transmitted according to an 802.11 protocol using orthogonal frequency-division multiplexing (OFDM), direct-sequence spread spectrum (DSSS) communication, a combination of OFDM and DSSS communication, single carrier, or other schemes. Certain of the devices described herein may implement a high-efficiency 802.11 standard, for example. Such devices, whether used as a STA, an AP, or another device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications. Although various systems, methods, and apparatuses are described herein with respect to a high-efficiency 802.11 standard, for example, a person having ordinary skill in the art will appreciate that the present disclosure is applicable to other wireless communication standards.

Certain of the devices described herein may further implement multi-user technology and be implemented as part of an 802.11 protocol. For example, such a device may employ orthogonal frequency domain multiple access (OFDMA) and/or multi-user MIMO (MU-MIMO). A MIMO system employs multiple (N) transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels or streams, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points (e.g., which may be or include an anchor point) and clients (also referred to as stations, or "STAs"). In general, an access point serves as a hub or base station for the WLAN and a STA serves as a user of the WLAN. For example, a STA may be a laptop computer, a personal digital assistant (PDA), a mobile phone, etc. In an example, a STA connects to an access point via a Wi-Fi (e.g., IEEE 802.11 protocol) compliant wireless link to obtain general connectivity to the Internet or to other wide area networks. In some implementations, a STA may also be used as an access point.

An access point may also include, be implemented as, or known as a Transmit Receive Point (TRP), a NodeB, an eNodeB, a gNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or referenced using other similar terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations, a STA may include, be implemented as, or known as a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 9:
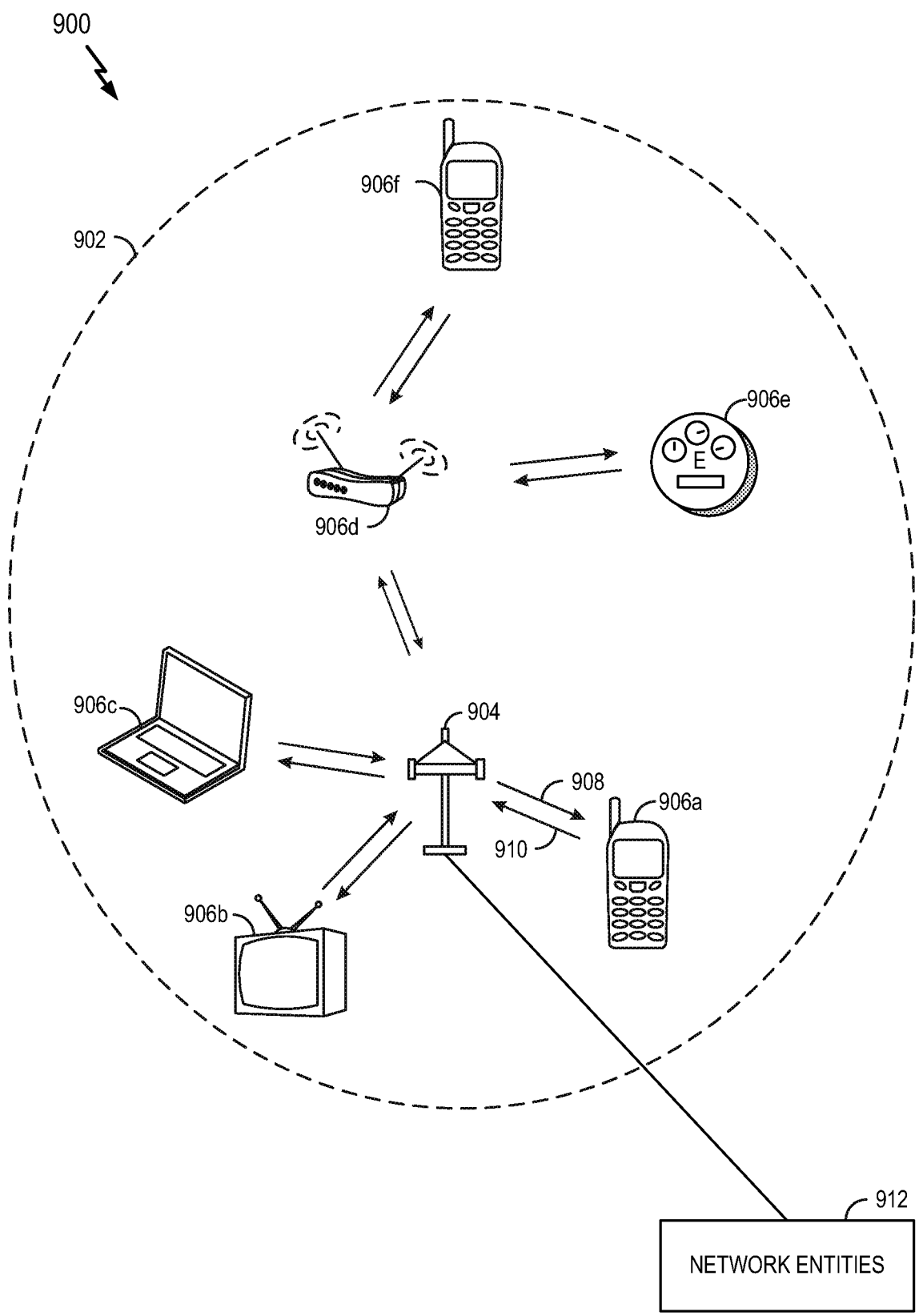
FIG. 9 illustrates an example of a wireless communication system in which aspects of the present disclosure may be employed.

FIG. 9 illustrates an example of a wireless communication system 900 in which aspects of the present disclosure may be employed. The wireless communication system 900 may operate pursuant to a wireless standard, for example the 802.11 standard. The wireless communication system 900 may include an access point 904, which communicates with STAs 906a, 906b, 906c, 906d, 906e, and 906f (collectively STAs 906).

STAs 906e and 906f may have difficulty communicating with the access point 904 or may be out of range and unable to communicate with the access point 904. As such, another STA 906d may be configured as a relay device (e.g., a device including STA and access point functionality) that relays communication between the access point 904 and the STAs 906e and 906f.

A variety of processes and methods may be used for transmissions in the wireless communication system 900 between the access point 904 and the STAs 906. For example, signals may be sent and received between the access point 904 and the STAs 906 in accordance with OFDM/OFDMA techniques. If this is the case, the wireless communication system 900 may be referred to as an OFDM/OFDMA system. Alternatively, signals may be sent and received between the access point 904 and the STAs 906 in accordance with CDMA techniques. If this is the case, the wireless communication system 900 may be referred to as a CDMA system.

A communication link that facilitates transmission from the access point 904 to one or more of the STAs 906 may be referred to as a downlink (DL) 908, and a communication link that facilitates transmission from one or more of the STAs 906 to the access point 904 may be referred to as an uplink (UL) 910. Alternatively, a downlink 908 may be referred to as a forward link or a forward channel, and an uplink 910 may be referred to as a reverse link or a reverse channel.

The access point 904 may act as a base station and provide wireless communication coverage in a basic service area (BSA) 902. The access point 904 along with the STAs 906 associated with the access point 904 and that use the access point 904 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the access point 904 or to some other access point in the network (not shown).

Each of the access points may communicate with one or more network entities (represented, for convenience, by network entities 912 in FIG. 9), including each other, to facilitate wide area network connectivity. A network entity may take various forms such as, for example, one or more radio and/or core network entities. Thus, in various implementations the network entities 912 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 900 might not have a central access point 904, but rather may function as a peer-to-peer network between the STAs 906. Accordingly, the functions of the access point 904 described herein may alternatively be performed by one or more of the STAs 906. Also, as mentioned above, a relay may incorporate at least some of the functionality of an access point and a STA.

Figure 10:
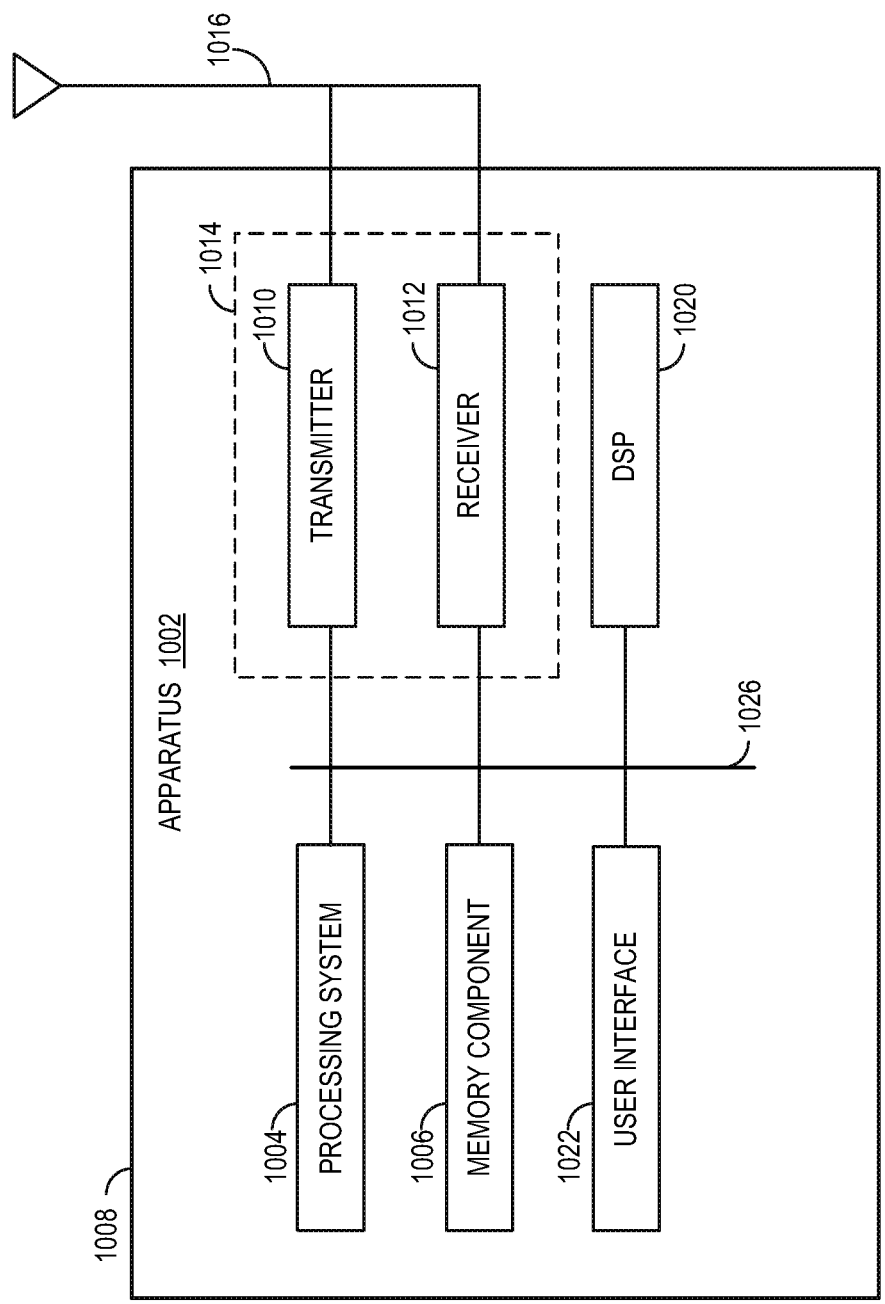
FIG. 10 is a functional block diagram of an example apparatus that may be employed within a wireless communication system in accordance with some aspects of the disclosure.

FIG. 10 illustrates various components that may be utilized in an apparatus 1002 (e.g., a wireless device) that may be employed within the wireless communication system 900. The apparatus 1002 is an example of a device that may be configured to implement the various methods described herein. For example, the apparatus 1002 may include the access point 904, a relay (e.g., the STA 906d), or one of the STAs 906 of FIG. 9.

The apparatus 1002 may include a processing system 1004 that controls operation of the apparatus 1002. The processing system 1004 may also be referred to as a central processing unit (CPU). A memory component 1006 (e.g., including a memory device), which may include both read-only memory (ROM) and random access memory (RAM), provides instructions and data to the processing system

1004. A portion of the memory component 1006 may also include non-volatile random access memory (NVRAM). The processing system 1004 typically performs logical and arithmetic operations based on program instructions stored within the memory component 1006. The instructions in the memory component 1006 may be executable to implement the methods described herein.

When the apparatus 1002 is implemented or used as a transmitting node, the processing system 1004 may be configured to select one of a plurality of media access control (MAC) header types, and to generate a packet having that MAC header type. For example, the processing system 1004 may be configured to generate a packet including a MAC header and a payload and to determine what type of MAC header to use.

When the apparatus 1002 is implemented or used as a receiving node, the processing system 1004 may be configured to process packets of a plurality of different MAC header types. For example, the processing system 1004 may be configured to determine the type of MAC header used in a packet and process the packet and/or fields of the MAC header.

The processing system 1004 may be implemented as or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1002 may also include a housing 1008 that may include a transmitter 1010 and a receiver 1012 to allow transmission and reception of data between the apparatus 1002 and a remote location. The transmitter 1010 and receiver 1012 may be combined into single communication device (e.g., a transceiver 1014). An antenna 1016 may be attached to the housing 1008 and electrically coupled to the transceiver 1014. The apparatus 1002 may also include (not shown) multiple transmitters, multiple receivers, multiple transceivers, and/or multiple antennas. A transmitter 1010 and a receiver 1012 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 1010 may be configured to wirelessly transmit packets having different MAC header types. For example, the transmitter 1010 may be configured to transmit packets with different types of headers generated by the processing system 1004, discussed above.

The receiver 1012 may be configured to wirelessly receive packets having different MAC header type. In some aspects, the receiver 1012 is configured to detect a type of a MAC header used and process the packet accordingly.

The receiver 1012 may be used to detect and quantify the level of signals received by the transceiver 1014. The receiver 1012 may detect such signals as total energy, energy per subcarrier per symbol, power spectral density and other signals. The apparatus 1002 may also include a digital signal processor (DSP) 1020 for use in processing signals. The DSP 1020 may be configured to generate a data unit for transmission. In some aspects, the data unit may include (e.g., may be) a physical layer data unit (PPDU). In some aspects, the PPDU is referred to as a packet.

The apparatus 1002 may further include a user interface 1022 in some aspects. The user interface 1022 may include (e.g., may be) a keypad, a microphone, a speaker, and/or a display. The user interface 1022 may include any element or component that conveys information to a user of the apparatus 1002 and/or receives input from the user.

The various components of the apparatus 1002 may be coupled together by a bus system 1026. The bus system 1026 may include a data bus, for example, as well as a power bus, a control signal bus, and a status signal bus in addition to the data bus. Those of skill in the art will appreciate the components of the apparatus 1002 may be coupled together or accept or provide inputs to each other using some other mechanism.

Although a number of separate components are illustrated in FIG. 10, one or more of the components may be combined or commonly implemented. For example, the processing system 1004 may be used to implement not only the functionality described above with respect to the processing system 1004, but also to implement the functionality described above with respect to the transceiver 1014 and/or the DSP 1020. Further, each of the components illustrated in FIG. 10 may be implemented using a plurality of separate elements. Furthermore, the processing system 1004 may be used to implement any of the components, modules, circuits, or the like described below, or each may be implemented using a plurality of separate elements.

For ease of reference, when the apparatus 1002 is configured as a transmitting node, it is hereinafter referred to as an apparatus 1002*t*. Similarly, when the apparatus 1002 is configured as a receiving node, it is hereinafter referred to as an apparatus 1002*r*. A device in the wireless communication system 900 may implement only functionality of a transmitting node, only functionality of a receiving node, or functionality of both a transmitting node and a receive node.

As discussed above, the apparatus 1002 may be implemented as an access point 904 or a STA 906, and may be used to transmit and/or receive communication having a plurality of MAC header types.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 10 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 11:
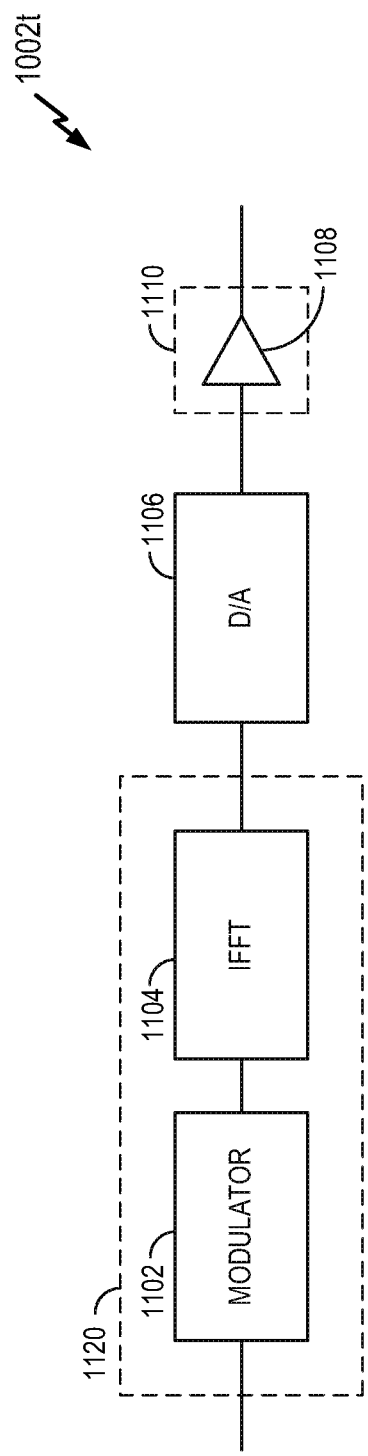
FIG. 11 is a functional block diagram of example components that may be utilized in the apparatus of FIG. 10 to transmit wireless communication.

As discussed above, the apparatus 1002 may be implemented as an access point 904 or a STA 906, a relay, or some other type of apparatus, and may be used to transmit and/or receive communication. FIG. 11 illustrates various components that may be utilized in the apparatus 1002t to transmit wireless communication. The components illustrated in FIG. 11 may be used, for example, to transmit OFDM communication. In some aspects, the components illustrated in FIG. 11 are used to generate and transmit packets to be sent over a bandwidth of less than or equal to 1 MHz.

The apparatus 1002t of FIG. 11 may include a modulator 1102 configured to modulate bits for transmission. For example, the modulator 1102 may determine a plurality of symbols from bits received from the processing system 1004 (FIG. 10) or the user interface 1022 (FIG. 10), for example by mapping bits to a plurality of symbols according to a constellation. The bits may correspond to user data or to control information. In some aspects, the bits are received in codewords. In one aspect, the modulator 1102 may include (e.g., may be) a QAM (quadrature amplitude modulation) modulator, for example, a 16-QAM modulator or a 64-QAM modulator. In other aspects, the modulator 1102 may include (e.g., may be) a binary phase-shift keying (BPSK) modulator, a quadrature phase-shift keying (QPSK) modulator, or an 8-PSK modulator.

The apparatus 1002t may further include a transform module 1104 configured to convert symbols or otherwise modulated bits from the modulator 1102 into a time domain. In FIG. 11, the transform module 1104 is illustrated as being implemented by an inverse fast Fourier transform (IFFT) module. In some implementations, there may be multiple transform modules (not shown) that transform units of data of different sizes. In some implementations, the transform module 1104 may be itself configured to transform units of data of different sizes. For example, the transform module 1104 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1104 may be referred to as the size of the transform module 1104.

In FIG. 11, the modulator 1102 and the transform module 1104 are illustrated as being implemented in the DSP 1120. In some aspects, however, one or both of the modulator 1102 and the transform module 1104 are implemented in the processing system 1004 or in another element of the apparatus 1002t (e.g., see description above with reference to FIG. 10).

As discussed above, the DSP 1120 may be configured to generate a data unit for transmission. In some aspects, the modulator 1102 and the transform module 1104 may be configured to generate a data unit including a plurality of fields including control information and a plurality of data symbols.

Returning to the description of FIG. 11, the apparatus 1002t may further include a digital to analog converter 1106 configured to convert the output of the transform module into an analog signal. For example, the time-domain output of the transform module 1104 may be converted to a baseband OFDM signal by the digital to analog converter 1106. The digital to analog converter 1106 may be implemented in the processing system 1004 or in another element of the apparatus 1002 of FIG. 10. In some aspects, the digital to analog converter 1106 is implemented in the transceiver 1014 (FIG. 10) or in a data transmit processor.

The analog signal may be wirelessly transmitted by the transmitter 1110. The analog signal may be further processed before being transmitted by the transmitter 1110, for example by being filtered or by being upconverted to an intermediate or carrier frequency. In the aspect illustrated in FIG. 11, the transmitter 1110 includes a transmit amplifier 1108. Prior to being transmitted, the analog signal may be amplified by the transmit amplifier 1108. In some aspects, the amplifier 1108 may include (e.g., may be) a low noise amplifier (LNA).

The transmitter 1110 is configured to transmit one or more packets or data units in a wireless signal based on the analog signal. The data units may be generated using the processing system 1004 (FIG. 10) and/or the DSP 1120, for example using the modulator 1102 and the transform module 1104 as discussed above. Data units that may be generated and transmitted as discussed above are described in additional detail below.

Figure 12:
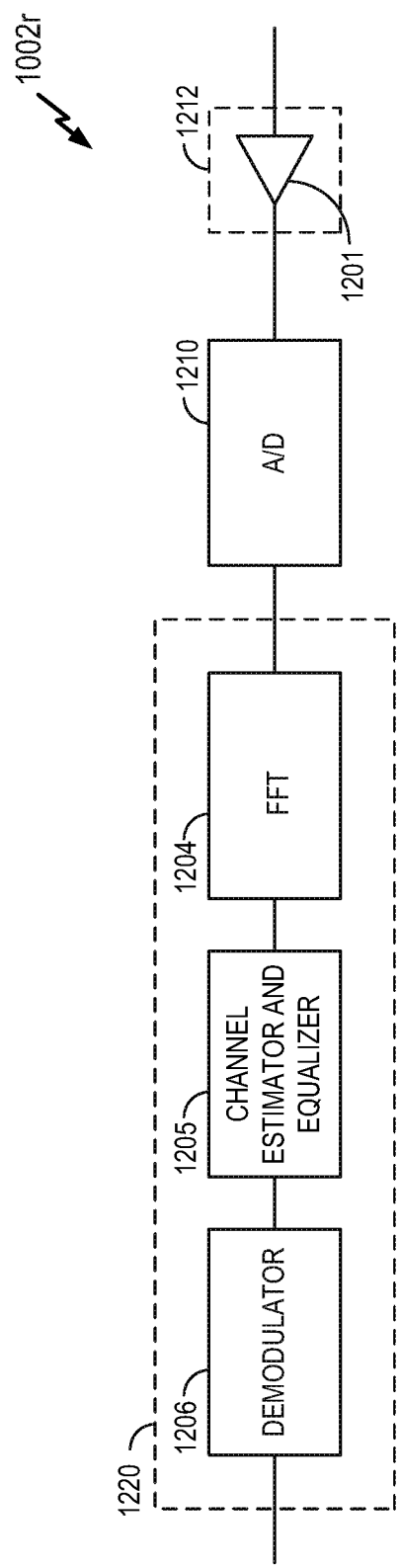
FIG. 12 is a functional block diagram of example components that may be utilized in the apparatus of FIG. 10 to receive wireless communication.

FIG. 12 illustrates various components that may be utilized in the apparatus 1002 of FIG. 10 to receive wireless communication. The components illustrated in FIG. 12 may be used, for example, to receive OFDM communication. For example, the components illustrated in FIG. 12 may be used to receive data units transmitted by the components discussed above with respect to FIG. 11.

The receiver 1212 of the apparatus 1002r is configured to receive one or more packets or data units in a wireless signal. Data units that may be received and decoded or otherwise processed as discussed below.

In the aspect illustrated in FIG. 12, the receiver 1212 includes a receive amplifier 1201. The receive amplifier 1201 may be configured to amplify the wireless signal received by the receiver 1212. In some aspects, the receiver 1212 is configured to adjust the gain of the receive amplifier 1201 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1201 may include (e.g., may be) an LNA.

The apparatus 1002r may include an analog to digital converter 1210 configured to convert the amplified wireless signal from the receiver 1212 into a digital representation thereof. Further to being amplified, the wireless signal may be processed before being converted by the analog to digital converter 1210, for example by being filtered or by being downconverted to an intermediate or baseband frequency. The analog to digital converter 1210 may be implemented in the processing system 1004 (FIG. 10) or in another element of the apparatus 1002r. In some aspects, the analog to digital converter 1210 is implemented in the transceiver 1014 (FIG. 10) or in a data receive processor.

The apparatus 1002r may further include a transform module 1204 configured to convert the representation of the wireless signal into a frequency spectrum. In FIG. 12, the transform module 1204 is illustrated as being implemented by a fast Fourier transform (FFT) module. In some aspects, the transform module may identify a symbol for each point that it uses. As described above with reference to FIG. 11, the transform module 1204 may be configured with a plurality of modes, and may use a different number of points to convert the signal in each mode. The number of points used by the transform module 1204 may be referred to as the size of the transform module 1204. In some aspects, the transform module 1204 may identify a symbol for each point that it uses.

The apparatus 1002r may further include a channel estimator and equalizer 1205 configured to form an estimate of the channel over which the data unit is received, and to remove certain effects of the channel based on the channel estimate. For example, the channel estimator and equalizer 1205 may be configured to approximate a function of the channel, and the channel equalizer may be configured to apply an inverse of that function to the data in the frequency spectrum.

The apparatus 1002r may further include a demodulator 1206 configured to demodulate the equalized data. For example, the demodulator 1206 may determine a plurality of bits from symbols output by the transform module 1204 and the channel estimator and equalizer 1205, for example by reversing a mapping of bits to a symbol in a constellation. The bits may be processed or evaluated by the processing system 1004 (FIG. 10), or used to display or otherwise output information to the user interface 1022 (FIG. 10). In this way, data and/or information may be decoded. In some aspects, the bits correspond to codewords. In one aspect, the demodulator 1206 may include (e.g., may be) a QAM (quadrature amplitude modulation) demodulator, for example an 8-QAM demodulator or a 64-QAM demodulator. In other aspects, the demodulator 1206 may include (e.g., may be) a binary phase-shift keying (BPSK) demodulator or a quadrature phase-shift keying (QPSK) demodulator.

In FIG. 12, the transform module 1204, the channel estimator and equalizer 1205, and the demodulator 1206 are illustrated as being implemented in the DSP 1220. In some aspects, however, one or more of the transform module 1204, the channel estimator and equalizer 1205, and the demodulator 1206 are implemented in the processing system 1004 (FIG. 10) or in another element of the apparatus 1002 (FIG. 10).

As discussed above, the wireless signal received at the receiver 1012 may include one or more data units. Using the functions or components described above, the data units or data symbols therein may be decoded evaluated or otherwise evaluated or processed. For example, the processing system 1004 (FIG. 10) and/or the DSP 1220 may be used to decode data symbols in the data units using the transform module 1204, the channel estimator and equalizer 1205, and the demodulator 1206.

Data units exchanged by the access point 904 and the STA 906 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1002t shown in FIG. 11 is an example of a single transmit chain used for transmitting via an antenna. The apparatus 1002r shown in FIG. 12 is an example of a single receive chain used for receiving via an antenna. In some implementations, the apparatus 1002t or 1002r may implement a portion of a MIMO system using multiple antennas to simultaneously transmit data.

The wireless communication system 900 may employ methods to allow efficient access of the wireless medium based on unpredictable data transmissions while avoiding collisions. As such, in accordance with various aspects, the wireless communication system 900 performs carrier sense multiple access/collision avoidance (CSMA/CA) that may be referred to as the Distributed Coordination Function (DCF). More generally, an apparatus 1002 having data for transmission senses the wireless medium to determine if the channel is already occupied. If the apparatus 1002 senses the channel is idle, then the apparatus 1002 transmits prepared data. Otherwise, the apparatus 1002 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus may include a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may include a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may take the form of an access point, a relay, or an access terminal.

A relay may include, be implemented as, or known as a relay node, a relay device, a relay station, a relay apparatus, or some other similar terminology. As discussed above, in some aspects, a relay may include some access terminal functionality and some access point functionality.

In some aspects, a wireless apparatus may be implemented as an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "$3^{rd}$ Generation Partnership Project" (3GPP), while cdma2000 is described in documents from an organization named "$3^{rd}$ Generation Partnership Project 2" (3GPP2). Although certain aspects of the disclosure may be described using 3GPP terminology, it is to be understood that the teachings herein may be applied to 3GPP (e.g., Rel99, Rel15, Rel16, Rel17) technology, as well as 3GPP2 (e.g., 1×RTT, 1×EV-DO Rel0, RevA, RevB) technology and other technologies.

Example Communication Device

Figure 13:
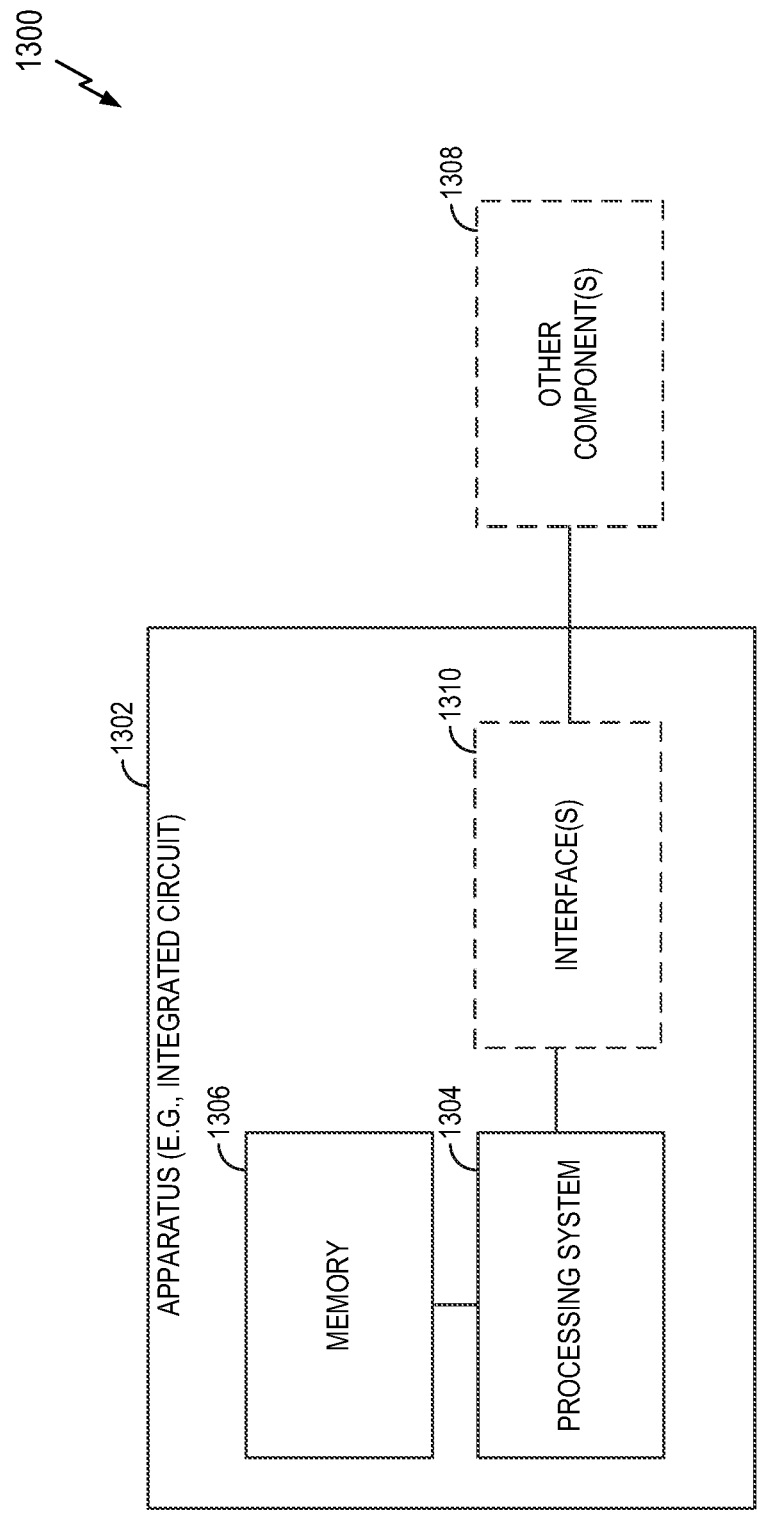
FIG. 13 is a functional block diagram of an example apparatus in accordance with some aspects of the disclosure.

FIG. 13 illustrates an example apparatus 1300 (e.g., a BS, a STA, an anchor point, an AT, or some other type of wireless communication node) according to certain aspects of the disclosure. The apparatus 1300 includes an apparatus 1302 (e.g., an integrated circuit) and, optionally, at least one other component 1308. In some aspects, the apparatus 1302 may be configured to operate in a wireless communication node (e.g., an anchor point or an AT) and to perform one or more of the operations described herein. For convenience, a wireless communication node may be referred to herein as a wireless node. The apparatus 1302 includes a processing system 1304, and a memory 1306 coupled to the processing system 1304. Example implementations of the processing system 1304 are provided herein. In some aspects, the processing system 1304 and the memory 1306 of FIG. 13 may correspond to the processing system 1004 and the memory component 1006 of FIG. 10.

The processing system 1304 is generally adapted for processing, including the execution of such programming stored on the memory 1306. For example, the memory 1306 may store instructions that, when executed by the processing system 1304, cause the processing system 1304 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 1302 communicates with at least one other component (i.e., a component 1308 external to the apparatus 1302) of the apparatus 1300. To this end, in some implementations, the apparatus 1302 may include at least one interface 1310 (e.g., a send/receive interface) coupled to the processing system 1304 for outputting and/or obtaining (e.g., sending and/or receiving) information (e.g., received information, generated information, decoded information, messages, etc.) between the processing system 1304 and the other component 1308. In some implementations, the interface 1310 may include an interface bus, bus drivers, bus receivers, other suitable circuitry, or a combination thereof. In some implementations, the interface 1310 may include radio frequency (RF) circuitry (e.g., an RF transmitter and/or an RF receiver). In some implementations, the interface 1310 may be configured to interface the apparatus 1302 to one or more other components of the apparatus 1300 (other components not shown in FIG. 13). For example, the interface 1310 may be configured to interface the processing system 1304 to a radio frequency (RF) front end (e.g., an RF transmitter and/or an RF receiver).

The apparatus 1302 may communicate with other apparatuses in various ways. In cases where the apparatus 1302 include an RF transceiver (not shown in FIG. 13), the apparatus may transmit and receive information (e.g. a frame, a message, bits, etc.) via RF signaling. In some cases, rather than transmitting information via RF signaling, the apparatus 1302 may have an interface to provide (e.g., output, send, transmit, etc.) information for RF transmission. For example, the processing system 1304 may output information, via a bus interface, to an RF front end for RF transmission. Similarly, rather than receiving information via RF signaling, the apparatus 1302 may have an interface to obtain information that is received by another apparatus. For example, the processing system 1304 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

First Example Process

Figure 14:
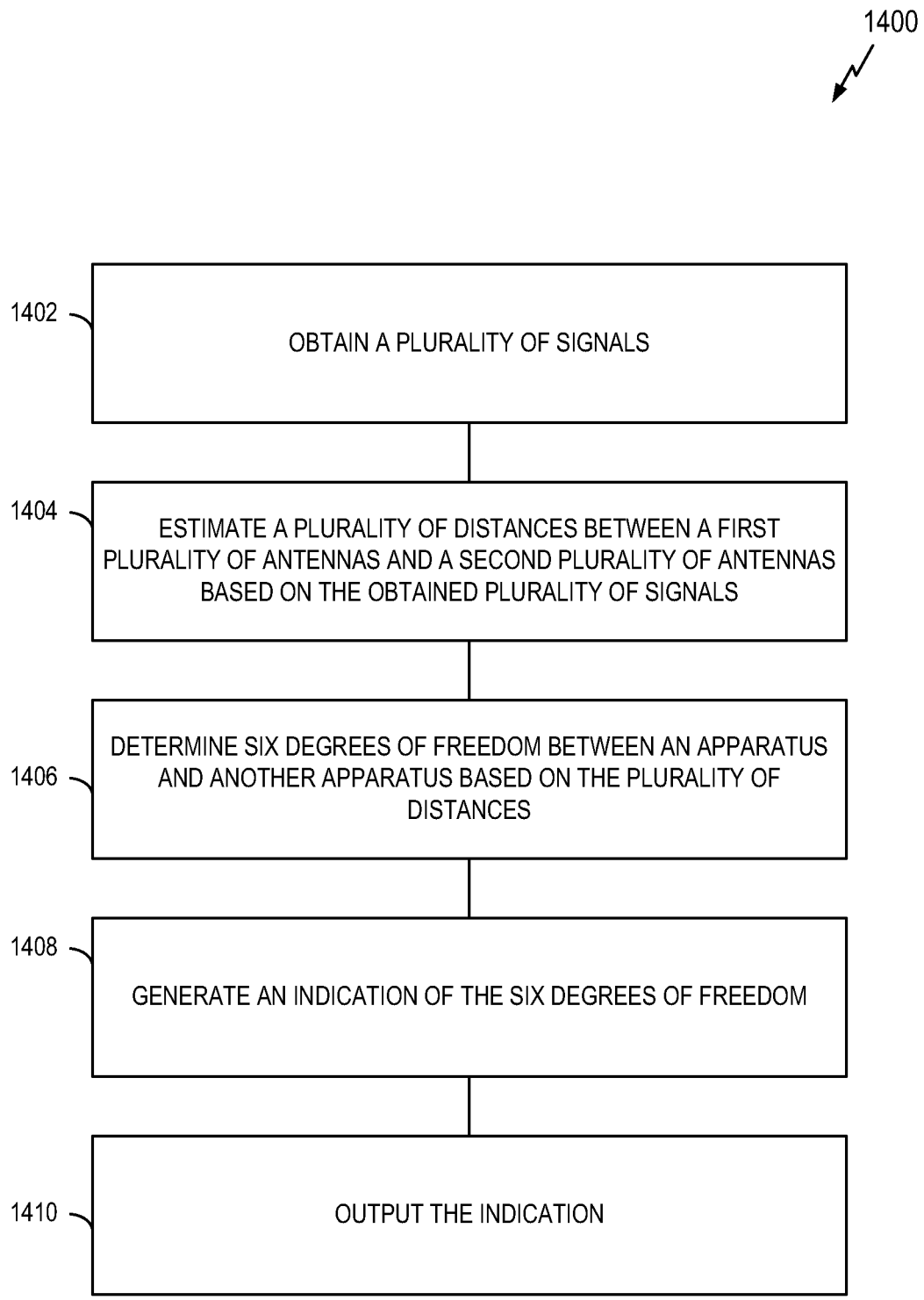
FIG. 14 is a flow diagram of an example process in accordance with some aspects of the disclosure.

FIG. 14 illustrates a process 1400 for communication in accordance with some aspects of the disclosure. The process 1400 may take place within a processing system (e.g., the processing system 1304 of FIG. 13), which may be located in an anchor point, a STA, an AT, or some other suitable apparatus. Of course, in various aspects within the scope of the disclosure, the process 1400 may be implemented by any suitable apparatus capable of supporting communication-related operations.

At block 1402, an apparatus (e.g., a chip or a wireless node that is currently receiving) obtains a plurality of signals. In some aspects, the plurality of signals may include (e.g., may be) millimeter wave signals. In some aspects, the plurality of signals may be obtained from a first plurality of antennas (e.g., located at the apparatus). In some aspects, the first plurality of antennas may receive the plurality of signals from a second plurality of antennas (e.g., located at another apparatus).

In some aspects, obtaining the signals may involve a chip acquiring the signals from another device (e.g., from a receiver that received the data). In some aspects, obtaining the signals may involve a wireless node or receiver receiving the signals.

At block 1404, the apparatus estimates a plurality of distances between a first plurality of antennas and a second plurality of antennas based on the obtained plurality of signals. In some aspects, the estimation of the plurality of distances may include conducting a plurality of round-trip-time (RTT) measurements.

At block 1406, the apparatus determines six degrees of freedom between an apparatus and another apparatus based on the plurality of distances. This determination may take different forms in different implementations. In some aspects, the determination of the six degrees of freedom may include one or more of the operations described below in conjunction with FIGS. 15-19.

At block 1408, the apparatus generates an indication of the six degrees of freedom. In some aspects, the six degrees of freedom may include: up-down, right-left, back-forward, roll, yaw, and pitch.

At block 1410, the apparatus outputs the indication. In some aspects, outputting the indication may involve a chip sending the indication to another device. In some aspects, outputting the indication may involve a chip outputting the indication for transmission by another device (e.g., by a transmitter). In some aspects, outputting the indication may involve a wireless node or a transmitter transmitting the indication.

The apparatuses and/or antennas may be configured in different ways in different implementations. In some aspects, any separation between any two antennas of the second plurality of antennas may be greater than or equal to a distance measurement resolution. In some aspects, any separation between any two antennas of the second plurality of antennas may be greater than or equal to at least one wavelength of the plurality of signals. In some aspects, the first plurality of antennas may be associated with (e.g., connected to or part of) the apparatus. In some aspects, the second plurality of antennas may be associated with (e.g., connected to or part of) the other apparatus.

In some aspects, a process in accordance with the teachings herein may include any combination of the operations of the process 1400.

Second Example Process

Figure 15:
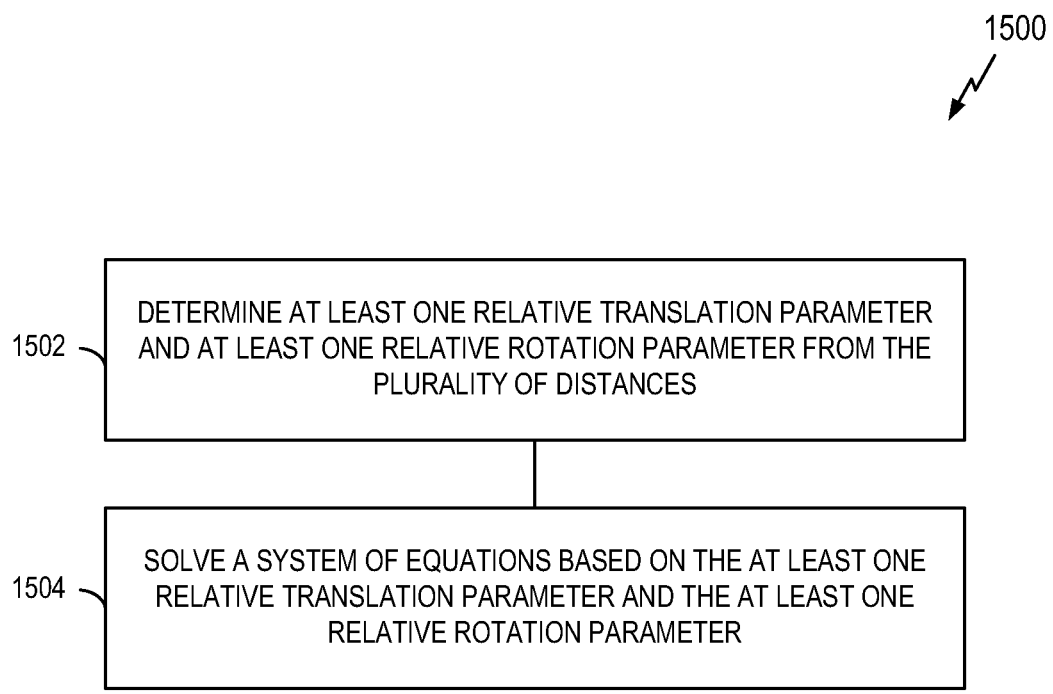
FIG. 15 is a flow diagram of an example process for solving a system of equations in accordance with some aspects of the disclosure.

FIG. 15 illustrates a process 1500 for communication in accordance with some aspects of the disclosure. One or more aspects of the process 1500 may be used in conjunction with (e.g., in addition to or as part of) the process 1400 of FIG. 14. For example, the process 1500 may correspond to the operations of block 1406. The process 1500 may take place within a processing system (e.g., the processing system 1304 of FIG. 13), which may be located in an anchor point, a STA, an AT, or some other suitable apparatus. Of course, in various aspects within the scope of the disclosure, the process 1500 may be implemented by any suitable apparatus capable of supporting communication-related operations.

At block 1502, an apparatus determines at least one relative translation parameter and at least one relative rotation parameter from the plurality of distances.

At block 1504, the apparatus solves a system of equations based on the at least one relative translation parameter and the at least one relative rotation parameter.

In some aspects, a process in accordance with the teachings herein may include any combination of the operations of the process 1500.

Third Example Process

Figure 16:
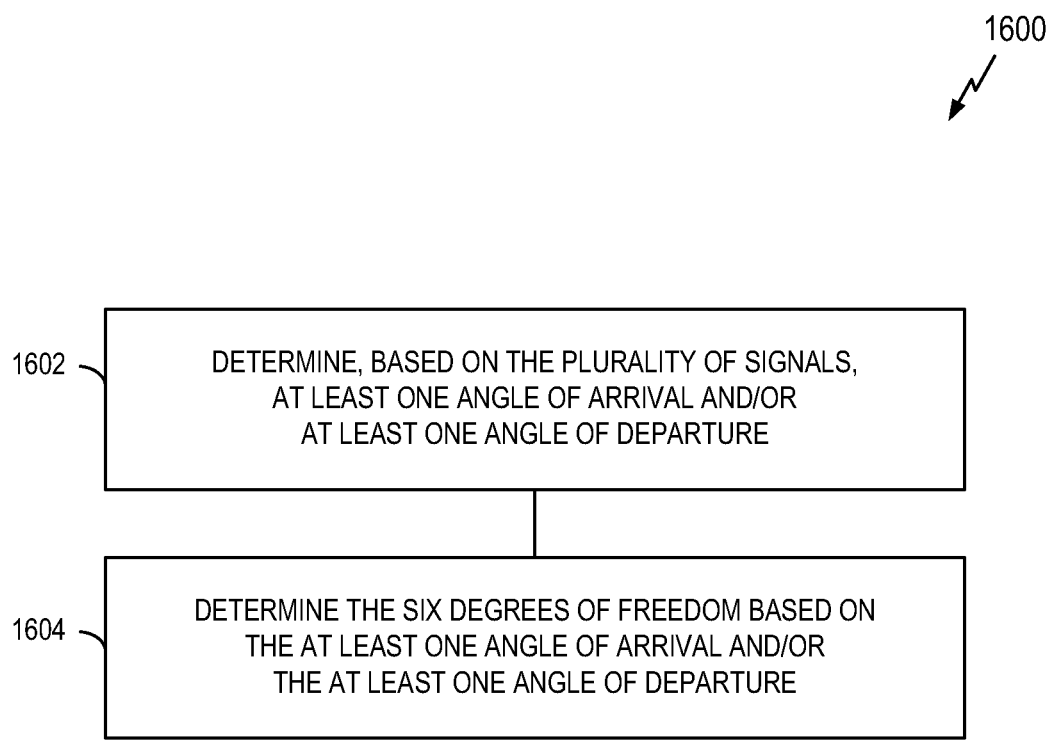
FIG. 16 is a flow diagram of an example angle-based process in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1400 of FIG. 14. For example, the process 1600 may correspond to the operations of block 1406. The process 1600 may take place within a processing system (e.g., the processing system 1304 of FIG. 13), which may be located in an anchor point, a STA, an AT, or some other suitable apparatus. Of course, in various aspects within the scope of the disclosure, the process 1600 may be implemented by any suitable apparatus capable of supporting communication-related operations.

At block 1602, an apparatus determines, based on the plurality of signals of block 1402 (e.g., at least a subset of the signals), at least one angle of arrival and/or at least one angle of departure.

At block 1604, the apparatus determines the six degrees of freedom based on the at least one angle of arrival and/or the at least one angle of departure. For example, the operations of block 1406 may be further based on the at least one angle of arrival and/or the at least one angle of departure.

In some aspects, a process in accordance with the teachings herein may include any combination of the operations of the process 1600.

Fourth Example Process

Figure 17:
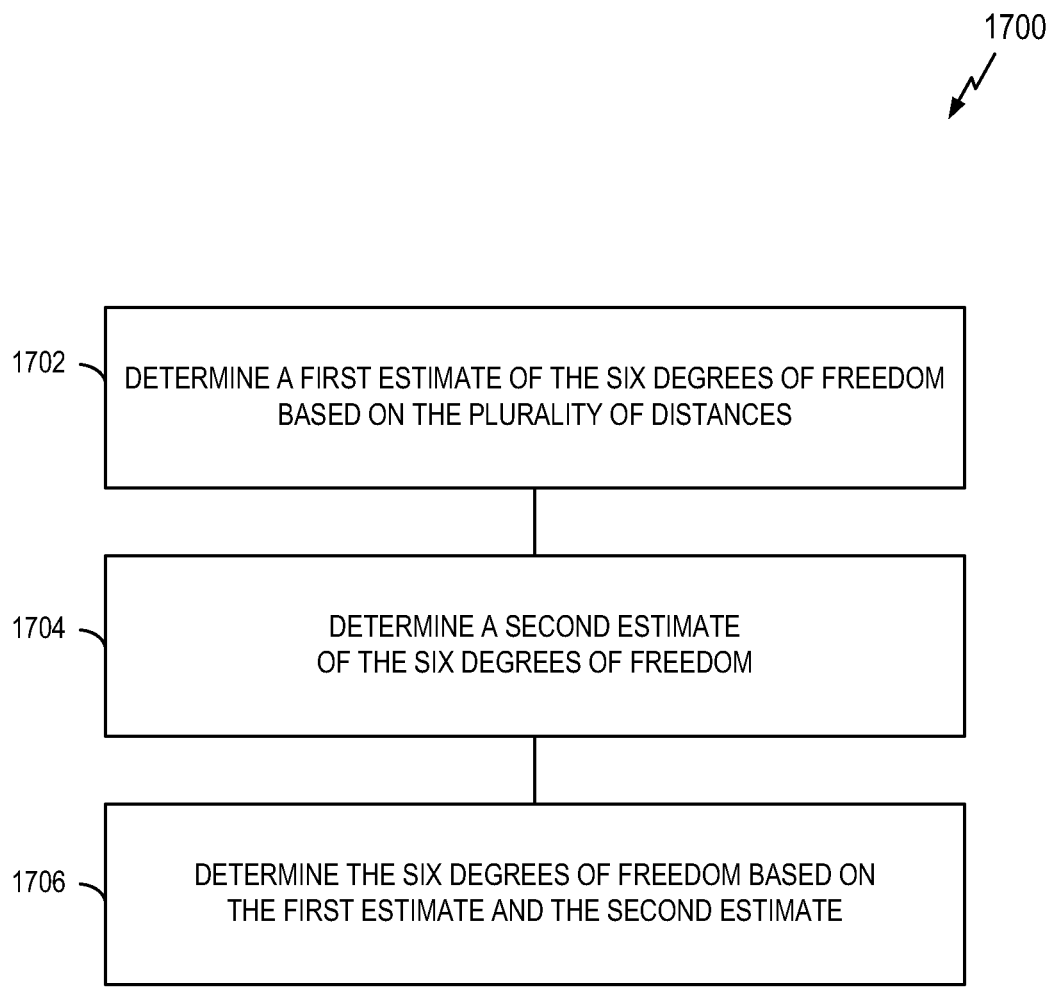
FIG. 17 is a flow diagram of an example process for estimating six degrees of freedom in accordance with some aspects of the disclosure.

FIG. 17 illustrates a process 1700 for communication in accordance with some aspects of the disclosure. One or more aspects of the process 1700 may be used in conjunction with (e.g., in addition to or as part of) the process 1400 of FIG. 14. For example, the process 1700 may correspond to the operations of block 1406. The process 1700 may take place within a processing system (e.g., the processing system 1304 of FIG. 13), which may be located in an anchor point, a STA, an AT, or some other suitable apparatus. Of course, in various aspects within the scope of the disclosure, the process 1700 may be implemented by any suitable apparatus capable of supporting communication-related operations.

At block 1702, an apparatus determines a first estimate of the six degrees of freedom based on the plurality of distances of block 1404.

At block 1704, the apparatus determines a second estimate of the six degrees of freedom. In some aspects, the second estimate may be based on inertia-based sensing, light-based sensing, or a combination thereof.

At block 1706, the apparatus determines the six degrees of freedom based on the first estimate and the second estimate. For example, the operations of block 1406 may be further based on the first estimate of block 1702 and the second estimate of block 1704.

In some aspects, a process in accordance with the teachings herein may include any combination of the operations of the process 1700.

Fifth Example Process

Figure 18:
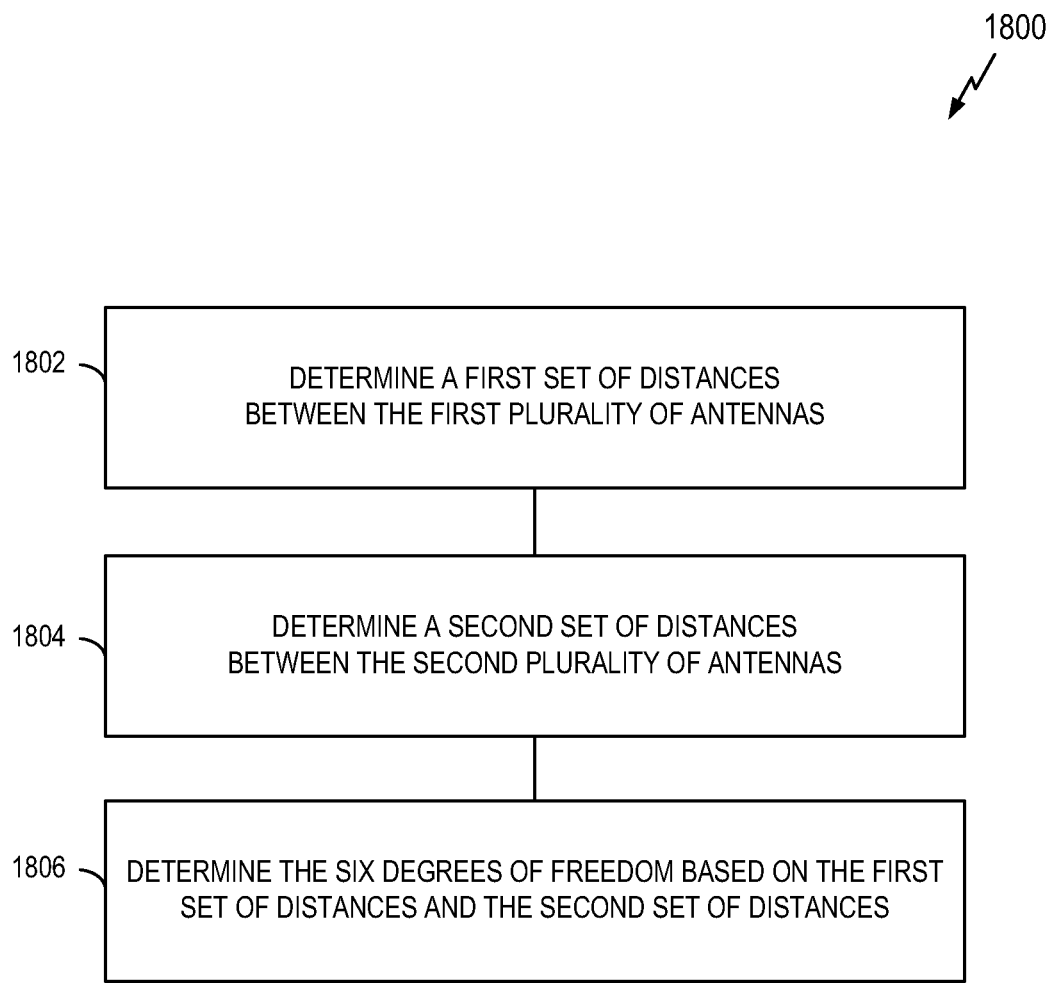
FIG. 18 is a flow diagram of an example distance-based process in accordance with some aspects of the disclosure.

FIG. 18 illustrates a process 1800 for communication in accordance with some aspects of the disclosure. One or more aspects of the process 1800 may be used in conjunction with (e.g., in addition to or as part of) the process 1400 of FIG. 14. For example, the process 1800 may correspond to the operations of block 1406. The process 1800 may take place within a processing system (e.g., the processing system 1304 of FIG. 13), which may be located in an anchor point, a STA, an AT, or some other suitable apparatus. Of course, in various aspects within the scope of the disclosure, the process 1800 may be implemented by any suitable apparatus capable of supporting communication-related operations.

At block 1802, an apparatus determines a first set of distances between the first plurality of antennas. For example, the apparatus may determine the distances between the antenna modules of a STA.

At block 1804, the apparatus determines a second set of distances between the second plurality of antennas. For example, the apparatus may determine the distances between the antenna modules of an AP.

At block 1806, the apparatus determines the six degrees of freedom based on the first set of distances and the second set of distances. For example, the operations of block 1406 may be further based on the first set of distances of block 1802 and the second set of distances of block 1804.

In some aspects, a process in accordance with the teachings herein may include any combination of the operations of the process 1800.

Sixth Example Process

Figure 19:
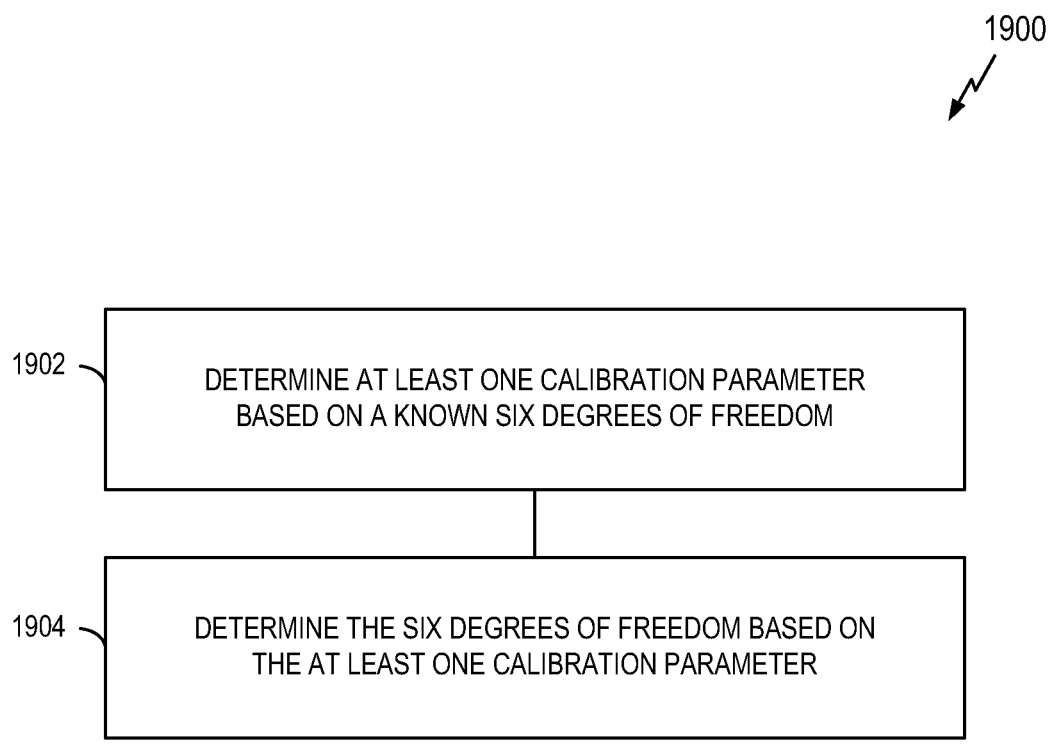
FIG. 19 is a flow diagram of an example calibration process in accordance with some aspects of the disclosure.

FIG. 19 illustrates a process 1900 for communication in accordance with some aspects of the disclosure. One or more aspects of the process 1900 may be used in conjunction with (e.g., in addition to or as part of) the process 1400 of FIG. 14. For example, the process 1900 may correspond to the operations of block 1406. The process 1900 may take place within a processing system (e.g., the processing system 1304 of FIG. 13), which may be located in an anchor point, a STA, an AT, or some other suitable apparatus. Of course, in various aspects within the scope of the disclosure, the process 1900 may be implemented by any suitable apparatus capable of supporting communication-related operations.

At block 1902, an apparatus determines at least one calibration parameter based on a known six degrees of freedom. For example, the apparatus may adapt the noise parameter of Equation 1.

At block 1904, the apparatus determines the six degrees of freedom based on the at least one calibration parameter. For example, the operations of block 1406 may be further based on the at least one calibration parameter of block 1902 (e.g., an adapted noise parameter).

In some aspects, a process in accordance with the teachings herein may include any combination of the operations of the process 1900.

Example Apparatus

Figure 20:
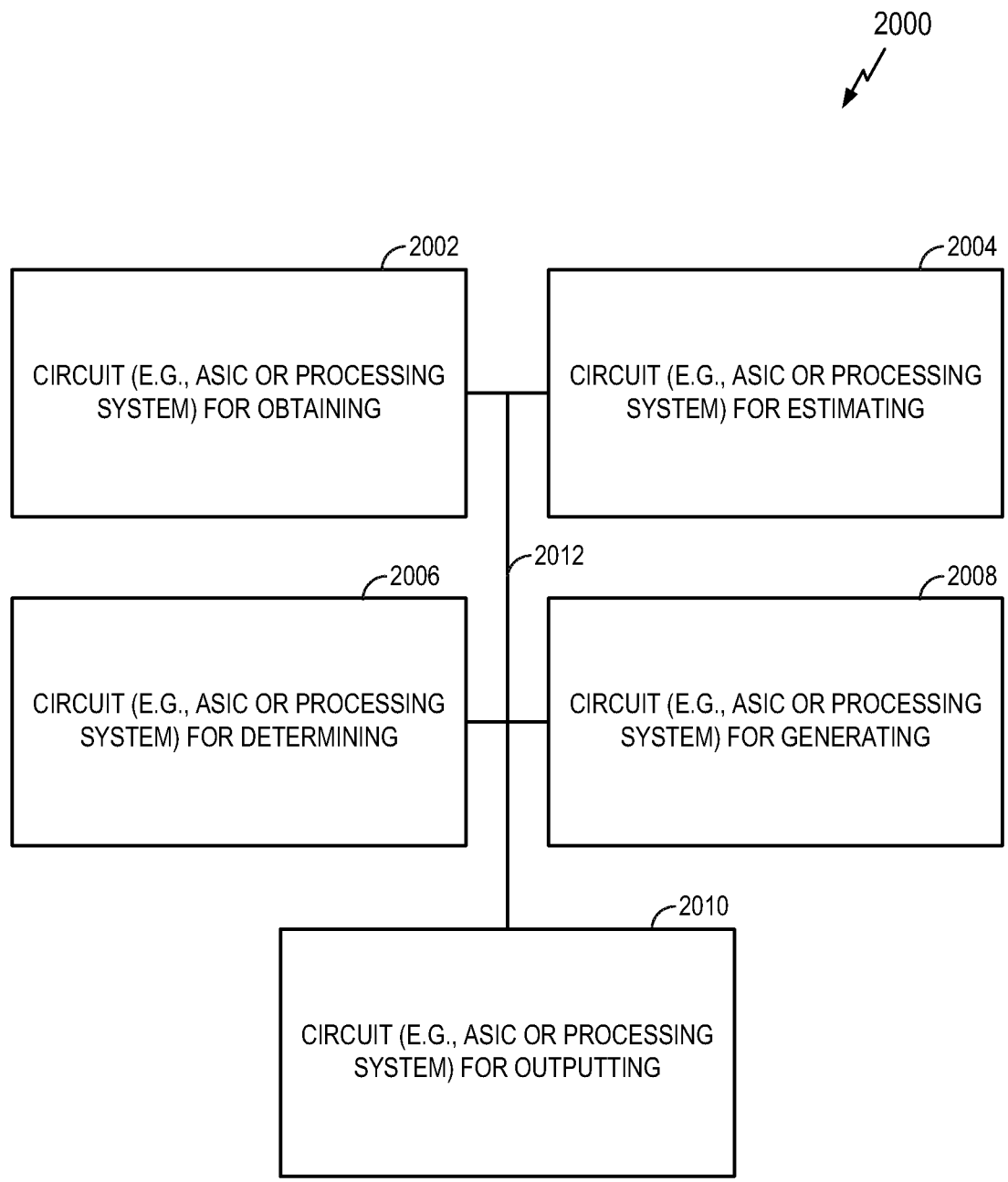
FIG. 20 is a simplified block diagram of several sample aspects of an apparatus configured with functionality in accordance with some aspects of the disclosure.

The components described herein may be implemented in a variety of ways. Referring to FIG. 20, an apparatus 2000 is represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 2000 includes one or more components (modules) that may perform one or more of the functions described herein with regard to various figures. For example, a circuit (e.g., an ASIC or processing system) for obtaining 2002, e.g., a means for obtaining, may correspond to, for example, an interface (e.g., a bus interface, a send/receive interface, or some other type of signal interface), a communication device, a transceiver, a receiver, or some other similar component as discussed herein. A circuit (e.g., an ASIC or processing system) for estimating 2004, e.g., a means for estimating, may correspond to, for example, a processing system as discussed herein. A circuit (e.g., an ASIC or processing system) for determining 2006, e.g., a means for determining, may correspond to, for example, a processing system as discussed herein. A circuit (e.g., an ASIC or processing system) for generating 2008, e.g., a means for generating, may correspond to, for example, a processing system as discussed herein. A circuit (e.g., an ASIC or processing system) for outputting 2010, e.g., a means for outputting, may correspond to, for example, an interface (e.g., a bus interface, a send/receive interface, or some other type of signal interface), a communication device, a transceiver, a transmitter, or some other similar component as discussed herein. Two or more of the modules of FIG. 20 may communicate with each other or some other component via a signaling bus 2012. In various implementations, the processing system 1004 of FIG. 10 and/or the processing system 1304 of FIG. 13 may include one or more of the circuit for obtaining 2002, the circuit for estimating 2004, the circuit for determining 2006, the circuit for generating 2008, or the circuit for outputting 2010.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes in FIG. 20 or elsewhere herein may be optional.

The apparatus 2000 include one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 2000 may include a single device (e.g., with the circuit for obtaining 2002, the circuit for estimating 2004, the circuit for determining 2006, the circuit for generating 2008, and the circuit for outputting 2010 implemented as different sections of an ASIC). As another specific example, the apparatus 2000 may include several devices (e.g., with the circuit for obtaining 2002 and the circuit for outputting 2010 implemented in one ASIC, and the circuit for estimating 2004, the circuit for determining 2006, and the circuit for generating 2008 implemented in another ASIC).

In addition, the components and functions represented by FIG. 20 as well as other components and functions described herein, may be implemented using any suitable means. Such means are implemented, at least in part, using corresponding structure as taught herein. For example, the components described above in conjunction with the "ASIC for" components of FIG. 20 correspond to similarly designated "means for" functionality. Thus, one or more of such means is implemented using one or more of processor components, integrated circuits, or other suitable structure as taught herein in some implementations. Several examples follow. A means for obtaining (e.g., signals or other information) may determine where to obtain information (e.g., from a memory device, a receiver, some other component, or some other apparatus), process the information if needed, and output the information to an appropriate destination (e.g., a memory device, or some other component), and perform other related operations as described herein. A means for estimating (e.g., distances) may acquire information (e.g., signal RTT information) upon which the estimation is to be based (e.g., from the means for obtaining, a transceiver, a memory device or some other component), perform a calculation based on the information (e.g., determine the distances Mij), output a result of the calculation (e.g., to a means for determining, a memory device, or some other component), and perform other related operations as described herein. A means for determining may obtain information (e.g., distance information, obtained signals, etc.) from a component of the apparatus (e.g., from the means for estimating, the means for obtaining, a memory device, a transceiver, or some other component), operate on the information (e.g., estimate 6 DoF, a translation parameter, a rotation parameter, an angle of arrival, an angle of departure, a distance between antennas (e.g., of an AP or a STA), a calibration parameter, or some other information), output the result of the operation (e.g., to the means for outputting, a memory device, or some other component), and perform other related operations as described herein. A means for generating may obtain information (e.g., 6 DoF information, etc.) from a component of the apparatus (e.g., from the means for determining, a memory device, or some other component), operate on the information (e.g., formulate an appropriate indication), output the result of the operation (e.g., to the means for outputting, a memory device, or some other component), and perform other related operations as described herein. A means for outputting (e.g., a signal, or other information) may obtain information to be output (e.g., from the means for generating, a memory device, or some other component), format the information if needed, send the information to an appropriate destination (e.g., a memory device, a transmitter, some other component, or some other apparatus), and perform other related operations as described herein.

The various operations of methods described herein may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar functionality and/or numbering. For example, the blocks of the processes 1400-1900 illustrated in FIGS. 14-19 may correspond at least in some aspects, to corresponding blocks of the apparatus 2000 illustrated in FIG. 20.

Example Programming

Figure 21:
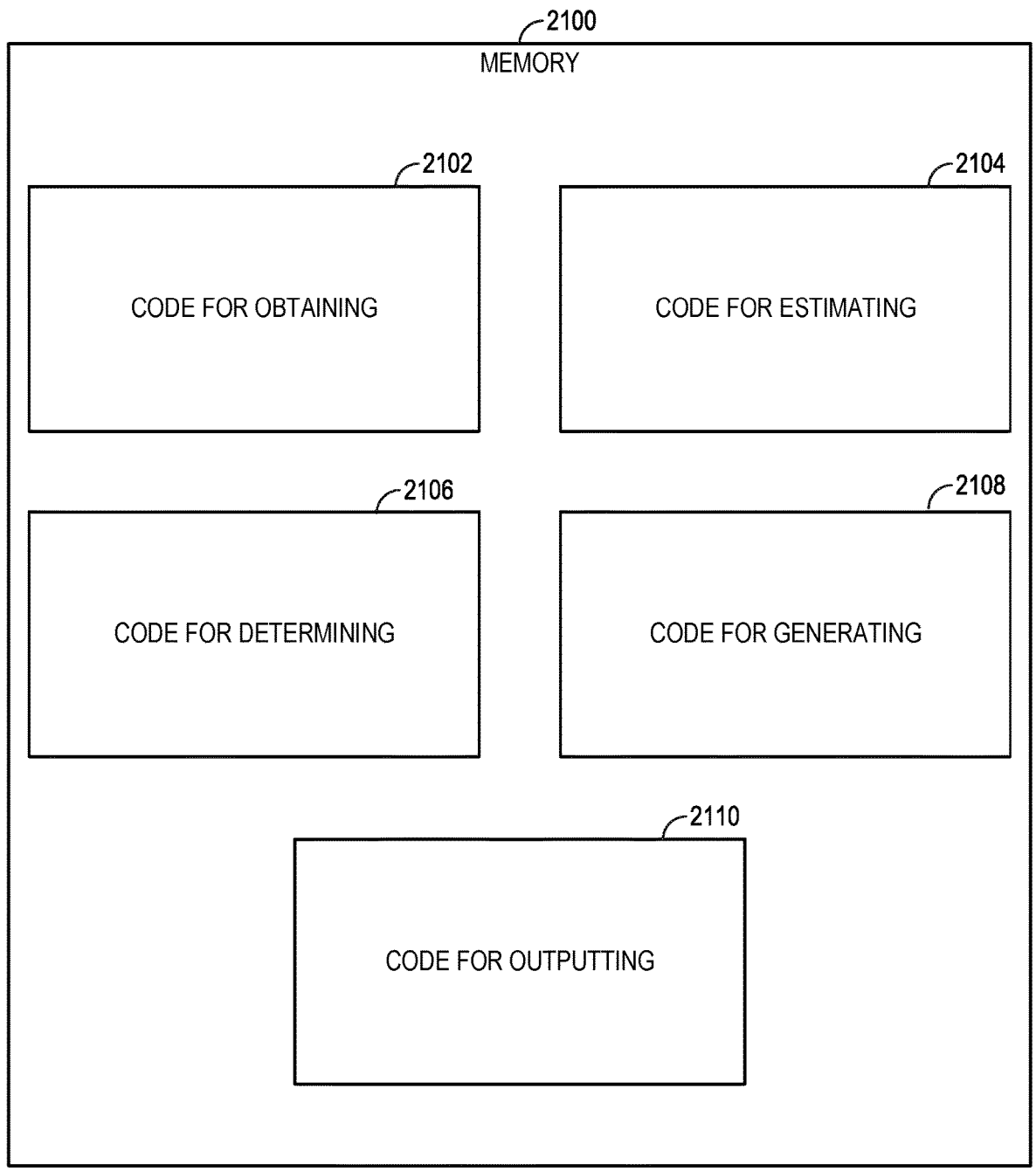
FIG. 21 is a simplified block diagram of several sample aspects of a memory configured with code in accordance with some aspects of the disclosure.

Referring to FIG. 21, programming stored by the memory 2100 (e.g. a storage medium, a memory device, etc.), when executed by a processing system (e.g., the processing system 1304 of FIG. 13), causes the processing system to perform one or more of the various functions and/or process operations described herein. For example, the programming may cause the processing system 1304 to perform the various functions, steps, and/or processes described herein with respect to FIGS. 1, 6, 7, and 14-19 in various implementations. As shown in FIG. 21, the memory 2100 may include one or more of code for obtaining 2102, code for estimating 2104, code for determining 2106, code for generating 2108, or code for outputting 2110. In some aspects, one of more of the code for obtaining 2102, the code for estimating 2104, the code for determining 2106, the code for generating 2108, or the code for outputting 2110 may be executed or otherwise used to provide the functionality described herein for the circuit for obtaining 2002, the circuit for estimating 2004, the circuit for determining 2006, the circuit for generating 2008, or the circuit for outputting 2010. In some aspects, the memory 2100 of FIG. 21 may correspond to the memory 1306 of FIG. 13.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, or c or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
an interface configured to obtain a plurality of signals received by a first plurality of antennas associated with the apparatus, wherein the first plurality of antennas is configured to receive the plurality of signals from a second plurality of antennas associated with another apparatus; and
a processing system coupled to the interface and configured to:
estimate, based on the plurality of signals obtained by the interface, a plurality of distances between the first plurality of antennas and the second plurality of antennas,
determine six degrees of freedom between the apparatus for communication and the other apparatus based on the plurality of distances, and
generate an indication of the six degrees of freedom,
wherein the interface is further configured to output the indication.

2. The apparatus of claim 1, wherein the plurality of signals comprises millimeter wave signals.

3. The apparatus of claim 1, wherein the determination of the six degrees of freedom comprises:
determining at least one relative translation parameter and at least one relative rotation parameter from the plurality of distances.

4. The apparatus of claim 3, wherein the determination of the six degrees of freedom further comprises:
solving a system of equations based on the at least one relative translation parameter and the at least one relative rotation parameter.

5. The apparatus of claim 1, wherein the estimation of the plurality of distances comprises conducting a plurality of round-trip-time (RTT) measurements.

6. The apparatus of claim 1, wherein the six degrees of freedom comprise: up-down, right-left, back-forward, roll, yaw, and pitch.

7. The apparatus of claim 1, wherein any separation between any two antennas of the second plurality of antennas is greater than or equal to a distance measurement resolution.

8. The apparatus of claim 1, wherein any separation between any two antennas of the second plurality of antennas is greater than or equal to at least one wavelength of the plurality of signals.

9. The apparatus of claim 1, wherein:
the processing system is further configured to determine at least one angle of arrival based on the plurality of signals; and
the determination of the six degrees of freedom is further based on the at least one angle of arrival.

10. The apparatus of claim 1, wherein:
the processing system is further configured to determine at least one angle of departure based on the plurality of signals; and
the determination of the six degrees of freedom is further based on the at least one angle of departure.

11. The apparatus of claim 1, wherein the determination of the six degrees of freedom comprises:
determining a first estimate of the six degrees of freedom based on the plurality of distances;
determining a second estimate of the six degrees of freedom; and
determining the six degrees of freedom based on the first estimate and the second estimate.

12. The apparatus of claim 11, wherein the second estimate is based on inertia-based sensing, light-based sensing, or a combination thereof.

13. The apparatus of claim 1, wherein:
the processing system is further configured to determine a first set of distances between the first plurality of antennas;
the processing system is further configured to determine a second set of distances between the second plurality of antennas; and
the determination of the six degrees of freedom is further based on the first set of distances and the second set of distances.

14. The apparatus of claim 1, wherein:
the processing system is further configured to determine at least one calibration parameter based on a known six degrees of freedom; and
the determination of the six degrees of freedom is further based on the at least one calibration parameter.

15. A method of communication, comprising:
obtaining a plurality of signals;
estimating a plurality of distances between a first plurality of antennas and a second plurality of antennas based on the plurality of signals;
determining six degrees of freedom between an apparatus and another apparatus based on the estimated plurality of distances;
generating an indication of the six degrees of freedom; and
outputting the indication.

16. The method of claim 15, wherein the plurality of signals comprises millimeter wave signals.

17. The method of claim 15, wherein the determination of the six degrees of freedom comprises:
determining at least one relative translation parameter and at least one relative rotation parameter from the plurality of distances.

18. A wireless node, comprising:
a first plurality of antennas;
a receiver configured to receive a plurality of signals via the first plurality of antennas;
a processing system configured to:
estimate a plurality of distances between the first plurality of antennas and a second plurality of antennas based on the plurality of signals,
determine six degrees of freedom between the wireless node and another wireless node based on the estimated plurality of distances, and
generate an indication of the six degrees of freedom; and
an interface configured to output the indication.

* * * * *